United States Patent
Ong et al.

(10) Patent No.: US 12,351,526 B2
(45) Date of Patent: *Jul. 8, 2025

(54) METHOD OF STABILIZING AN ADMIXTURE COMPONENT, A STABILIZED ADMIXTURE FOR CEMENTITIOUS COMPOSITIONS, CEMENTITIOUS COMPOSITION, CEMENTITIOUS STRUCTURES AND METHODS OF MAKING THE SAME

(71) Applicant: Construction Research & Technology GmbH, Trostberg (DE)

(72) Inventors: Shaode Ong, Solon, OH (US); Paul Seiler, Aurora, OH (US); Suz-chung Ko, Chagrin Falls, OH (US); Michael Myers, Mayfield Heights, OH (US); Sandra Sprouts, Oakwood Village, OH (US); Thomas Vickers, Mentor, OH (US); Jacki J. Atienza, Reminderville, OH (US)

(73) Assignee: Construction Research & Technology GmbH, Trostberg (DE)

( * ) Notice: Subject to any disclaimer, the term of this patent is extended or adjusted under 35 U.S.C. 154(b) by 894 days.

This patent is subject to a terminal disclaimer.

(21) Appl. No.: 17/420,880

(22) PCT Filed: Jan. 10, 2020

(86) PCT No.: PCT/US2020/013016
§ 371 (c)(1),
(2) Date: Jul. 6, 2021

(87) PCT Pub. No.: WO2020/146695
PCT Pub. Date: Jul. 16, 2020

(65) Prior Publication Data
US 2022/0098120 A1     Mar. 31, 2022

Related U.S. Application Data

(60) Provisional application No. 62/790,796, filed on Jan. 10, 2019.

(51) Int. Cl.
*C04B 40/00*    (2006.01)
*C04B 14/06*    (2006.01)
(Continued)

(52) U.S. Cl.
CPC ........ *C04B 40/0039* (2013.01); *C04B 14/062* (2013.01); *C04B 24/163* (2013.01); *C04B 2103/0062* (2013.01); *C04B 2103/44* (2013.01)

(58) Field of Classification Search
CPC . C04B 40/0039; C04B 14/062; C04B 24/163; C04B 2103/0062; C04B 2103/44;
(Continued)

(56) References Cited

U.S. PATENT DOCUMENTS

2006/0147681 A1* 7/2006 Dubey .................... C04B 16/08
                                                                        428/192
2019/0308217 A1* 10/2019 Okazaki .................. C09D 7/70

FOREIGN PATENT DOCUMENTS

EP        0263606 A2 * 4/1988
JP        2003177564 A * 6/2003 ......... G03G 5/14769

OTHER PUBLICATIONS

The Dow Chemical Company, Dow Coating Materials "AcrysolTM Rheology Modifiers Product Solutions Guide", 2013 (Year: 2013).*
(Continued)

*Primary Examiner* — Colin W. Slifka
(74) *Attorney, Agent, or Firm* — Curatolo Sidoti & Trillis Co., LPA; Salvatore A. Sidoti; Floyd Trillis III

(57) ABSTRACT

Additives for cementitious compositions are stabilized against particle agglomeration. The additive may be provided in an aqueous liquid admixture composition for
(Continued)

cementitious compositions that includes the additive, a polymer thickener, and water, where the particles are stabilized against agglomeration and the admixture is stabilized against physical separation. The method for stabilizing the additive against particle agglomeration utilizes a pH sensitive thickener that may be activated through neutralization of acid groups on the polymer thickener. Methods of making cementitious compositions and hardened cementitious structures using the stabilized additive and admixture are also disclosed.

20 Claims, 9 Drawing Sheets

(51) Int. Cl.
    *C04B 24/16* (2006.01)
    *C04B 103/00* (2006.01)
    *C04B 103/44* (2006.01)

(58) Field of Classification Search
    CPC ............ C04B 2103/0082; C04B 28/02; C04B 14/306; C04B 20/0048; C04B 20/008; C04B 22/062; C04B 22/064; C04B 22/10; C04B 22/106; C04B 24/121; C04B 38/02; C04B 2103/12; C04B 2103/22; C04B 2103/30; C04B 2103/304; C04B 2103/32; C04B 2103/408; C04B 2103/46; C04B 2103/54; C04B 2103/58; C04B 2103/61; C04B 2103/67; C04B 2103/69; C04B 18/146; C04B 24/2641; Y02W 30/91

See application file for complete search history.

(56) References Cited

OTHER PUBLICATIONS

The Dow Chemical Company "Technical Data Sheet Dow AcrysolTM TT-615 Rheology Modifier", Mar. 2013 (Year: 2013).*
Jeong et al. "Effect of Admixtures on Pumpability for High-Strength Concrete" in ACI Materials Journal, 2016 (Year: 2016).*
Yamada at al. "Effects of the chemical structure on the properties of polycarboxylate-type superplasticizer" in Cement and Concrete Research, 1999 (Year: 1999).*
JP2003177564 machine translation (Year: 2003).*
International Preliminary Report on Patentability for Application No. PCT/US2020/013016 dated Jun. 16, 2021.
International Preliminary Report on Patentability for Application No. PCT/US2020/013092 dated Jun. 16, 2021.
International Search Report for Application No. PCT/US2020/013092 dated Apr. 22, 2020.
Written Opinion of the International Searching Authority for Application No. PCT/US2020/013092 dated Apr. 22, 2020.
Standard Test Method for Potential Alkali Reactivity of Aggregates (Mortar-Bar Method), C1260-14, ASTM International, Aug. 1, 2014.

* cited by examiner

METHOD OF STABILIZING AN ADMIXTURE COMPONENT, A STABILIZED ADMIXTURE FOR CEMENTITIOUS COMPOSITIONS, CEMENTITIOUS COMPOSITION, CEMENTITIOUS STRUCTURES AND METHODS OF MAKING THE SAME

CROSS REFERENCE TO RELATED APPLICATIONS

This application is a national stage application of International Application No PCT/US2020/013016, filed 10 Jan. 2020, which claims priority from U.S. Provisional Patent Application No. 62/790,796, filed 10 Jan. 2019, both of which applications are incorporated herein by reference.

TECHNICAL FIELD

The present disclosure is directed to a method of stabilizing admixture components, a stabilized admixture composition for cementitious compositions, cementitious compositions including the stabilized admixture composition, a method of making the cementitious composition with the stabilized admixture composition, and a hardened cementitious structure prepared from the cementitious composition including the stabilized admixture composition.

The present disclosure is more particularly directed to a method of stabilizing particulate admixture components, an admixture composition for cementitious compositions comprising a stabilized particulate admixture component, cementitious compositions including the admixture composition comprising the stabilized particulate admixture component, a method of making the cementitious composition with the admixture composition, and a hardened cementitious structure prepared from the cementitious composition including the admixture composition.

BACKGROUND

Concrete compositions are prepared from a mixture of hydraulic cement (for example, Portland cement), mineral aggregate and water. The aggregate used to prepare concrete compositions typically includes a blend of fine aggregate such as sand and coarse aggregate such as stone (for example, crushed limestone).

Chemical admixtures and additives are often added to concrete compositions to impart desired performance properties to the concrete composition. ASTM C 125-68, *"Standard Definitions of Terms Relating to Concrete and Concrete Aggregates,"* defines an admixture as a material other than water, aggregates, and Portland cement that is used as an ingredient of concrete and is added to the batch immediately before or during its mixing.

Certain admixture components may be provided as particles, either hollow or solid particles. The manufacture, transport and storage of particle admixture components typically results in agglomeration of particles. The agglomeration of the particles of solid hinders the ability of the particulates to maximize their intended function, or impart the desired performance property, on the concrete composition to which it is added.

The use of particulate mineral admixture components, for example, have certain disadvantages. Undensified silica fume is dusty and moisture sensitive. Densified silica fume exhibits low pozzolanic reactivity and is moisture sensitive. Densified silica fume is produced by treating silica fume to increase its bulk density up about 400 kg/m$^3$ to about 720 kg/m$^3$. Densification is usually accomplished through an air-densification process involving tumbling of the silica fume powder in a storage silo. The air-densification process is carried out by blowing compressed air from the bottom of the silo causing the silica fume particles to tumble within the silo. As the silica fume particles tumble they agglomerate together. Densified silica fume also requires large storage silos. The use of colloidal suspension of silica fume results in difficulty in controlling the water content in concrete compositions and inaccuracy in silica dosage due to sedimentation/settling. Colloidal suspension are stored in large dispensing tanks that require continuous agitation to maintain the silica fume particle in suspension.

Therefore, what is still needed in the art are admixtures compositions having stabilized active particulate additives that are more effective in imparting the desired performance property to the cementitious composition to which it is added, which possess workable rheology that enable easy dispensing of the admixture composition to a cementitious composition, do not appreciably alter the rheology of the cementitious composition to which it is added, and which achieve a higher loading of the active particulate additive within a given volume of admixture.

SUMMARY

According to a first aspect, disclosed is a particulate additive for cementitious compositions that is stabilized against particle agglomeration by a polymer thickener.

According to a further aspect, disclosed is an admixture composition for cementitious compositions that comprises a particulate additive for cementitious compositions that is stabilized against particle agglomeration by a polymer thickener, and wherein the admixture composition is stabilized against physical separation by the polymer thickener.

According to a further aspect, disclosed is a method for making an aqueous admixture composition for cementitious compositions comprising (i) combining together particles of an additive for cementitious compositions, a polymer thickener, and water to form a mixture, and (ii) activating the thickening of the polymer thickener, wherein said particles of said additive are stabilized against agglomeration, and the admixture composition is stabilized against physical separation, by said activated polymer thickener.

According to a further aspect, disclosed is a method for making an aqueous admixture composition for cementitious compositions comprising (i) combining together particles of an additive for cementitious compositions, a polymer thickener having acid groups, and water to form a mixture, and (ii) neutralizing at a least a portion of the acid groups of the polymer thickener to activate the thickening of the thickener, wherein said particles of said additive are stabilized against agglomeration, and the admixture composition is stabilized against physical separation, by said activated polymer thickener.

According to a further aspect, disclosed is an admixture composition for cementitious compositions prepared by the method comprising (i) combining together particles of an additive for cementitious compositions, a polymer thickener, and water to form a mixture, and (ii) activating the thickening of the polymer thickener, wherein said particles of said additive are stabilized against agglomeration, and the admixture composition is stabilized against physical separation, by said activated polymer thickener.

According to a further aspect, disclosed is an admixture composition for cementitious compositions prepared by the method comprising (i) combining together particles of an additive for cementitious compositions, a polymer thickener having acid groups, and water to form a mixture, and (ii) neutralizing at a least a portion of the acid groups of the polymer thickener to activate the thickening of the thickener, wherein said particles of said additive are stabilized against agglomeration, and the admixture composition is stabilized against physical separation, by said activated polymer thickener.

According to a further aspect, disclosed is a cementitious composition comprising (i) a hydraulic cementitious binder, (ii) mineral aggregate, (iii) an admixture composition comprising particles of an additive stabilized against agglomeration by a polymer thickener, and (iv) water, and wherein the admixture composition is stabilized against physical separation.

According to a further aspect, disclosed is a cementitious composition comprising (i) a hydraulic cementitious binder, (ii) mineral aggregate, (iii) admixture composition for cementitious compositions prepared by the method comprising (iii)(a) combining together particles of an additive for cementitious compositions, a polymer thickener, and water to form a mixture and (iii)(b) activating the thickening of the polymer thickener, wherein said particles of said additive are stabilized against agglomeration, and the admixture composition is stabilized against physical separation, by said activated polymer thickener, and (iv) water.

According to a further aspect, disclosed is a cementitious composition comprising (i) a hydraulic cementitious binder, (ii) mineral aggregate, (iii) admixture composition for cementitious compositions prepared by the method comprising (iii)(a) combining together particles of an additive for cementitious compositions, a polymer thickener having acid groups, and water to form a mixture and (iii)(b) neutralizing at a least a portion of the acid groups of the polymer thickener to activate the thickening of the thickener, wherein said particles of said additive are stabilized against agglomeration, and the admixture composition is stabilized against physical separation, by said activated polymer thickener, and (iv) water.

According to a further aspect, disclosed is a method of preparing a cementitious structure comprising (i) preparing a cementitious composition comprising (a) hydraulic cementitious binder, (b) mineral aggregate, (c) an admixture composition for cementitious compositions prepared by the method comprising (c)(1) combining together particles of an additive for cementitious compositions, a polymer thickener, and water to form a mixture and (c)(2) activating the thickening of the polymer thickener, wherein said particles of said additive are stabilized against agglomeration, and the admixture composition is stabilized against physical separation, by said activated polymer thickener, and (d) water, (ii) placing the prepared cementitious composition at a desired location, and (iii) allowing the cementitious composition to harden.

According to a further aspect, disclosed is a method of preparing a cementitious structure comprising (i) preparing a cementitious composition comprising (a) hydraulic cementitious binder, (b) mineral aggregate, (c) an admixture composition for cementitious compositions prepared by the method comprising (c)(1) combining together particles of an additive for cementitious compositions, a polymer thickener having acid groups, and water to form a mixture and (c)(2) neutralizing at a least a portion of the acid groups of the polymer thickener to activate the thickening of the thickener, wherein said particles of said additive are stabilized against agglomeration, and the admixture composition is stabilized against physical separation, by said activated polymer thickener, and (d) water, (ii) placing the prepared cementitious composition at a desired location, and (iii) allowing the cementitious composition to harden.

According to a further aspect, disclosed is the use of the admixture composition prepared by the method comprising (i) combining together particles of an additive for cementitious compositions, a polymer thickener, and water to form a mixture and (ii) activating the thickening of the polymer thickener, wherein said particles of said additive are stabilized against agglomeration, and the admixture composition is stabilized against physical separation, by said activated polymer thickener, for the preparation of a cementitious composition.

According to a further aspect, disclosed is the use of the admixture composition prepared by the method comprising (i) combining together particles of an additive for cementitious compositions, a polymer thickener having acid groups, and water to form a mixture and (ii) neutralizing at a least a portion of the acid groups of the polymer thickener to activate the thickening of the thickener, wherein said particles of said additive are stabilized against agglomeration, and the admixture composition is stabilized against physical separation, by said activated polymer thickener, for the preparation of a cementitious composition.

According to a further aspect, disclosed is the use of the admixture composition prepared by the method comprising (i) combining together particles of an additive for cementitious compositions, a polymer thickener, and water to form a mixture and (ii) activating the thickening of the polymer thickener, wherein said particles of said additive are stabilized against agglomeration, and the admixture composition is stabilized against physical separation, by said activated polymer thickener, for the preparation of a hardened cementitious structure.

According to a further aspect, disclosed is the use of the admixture composition prepared by the method comprising (i) combining together particles of an additive for cementitious compositions, a polymer thickener having acid groups, and water to form a mixture and (ii) neutralizing at a least a portion of the acid groups of the polymer thickener to activate the thickening of the thickener, wherein said particles of said additive are stabilized against agglomeration, and the admixture composition is stabilized against physical separation, by said activated polymer thickener, for the preparation of a hardened cementitious structure.

DETAILED DESCRIPTION

Figure 1:
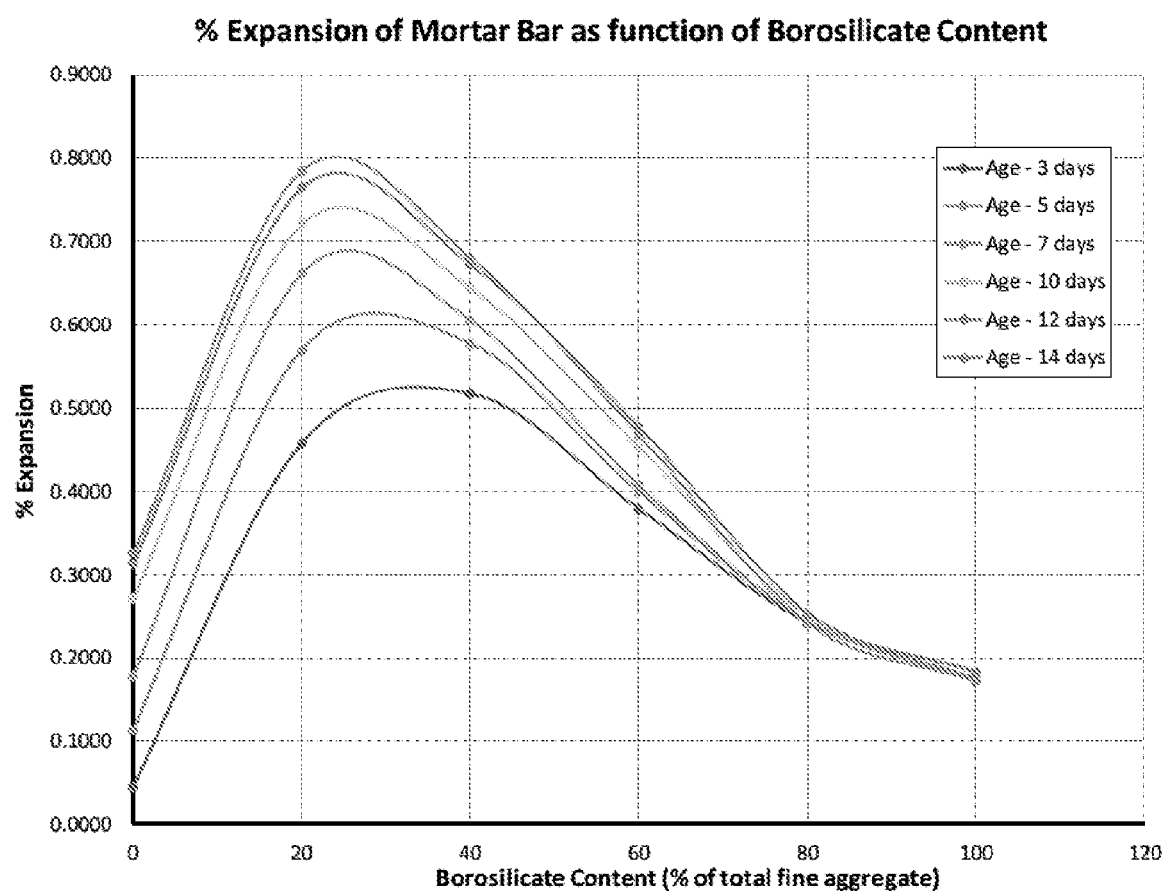
FIG. 1 is a graph showing percent expansion of mortar bar samples as a function of reactive borosilicate aggregate content.

Disclosed is a liquid admixture for cementitious compositions that comprises particulate additives that are stabilized against agglomeration and which is stabilized against physical separation. The admixture for cementitious compositions comprises a mixture of a particulate admixture component, a thickener to thicken the liquid admixture, and to stabilize the particulate admixture component against particle agglomeration and to stabilize the liquid admixture itself from physical separation, and water.

The stabilization of the particulate admixture component within a liquid admixture may be achieved by the thickening of an organic polymer thickener. The thickening effect of may be triggered by an activating agent for the thickener. For example, and without limitation, the thickening effect may be triggered by a change in the pH of the liquid admixture containing the particulate additive and the organic polymer thickener. The change in pH of the liquid admixture may be achieved through the neutralization of acid groups on the organic polymer thickener. The term "neutralization" as used in this Specification means a degree of deprotonation of acid groups of the organic polymer thickener. Deprotonation of acid groups of the organic polymer thickener may be partial deprotonation where less than all of the acid groups of the organic polymer thickener are deprotonated, or full deprotonation all of the acid groups carried on the organic polymer thickener are deprotonated.

According to certain illustrative embodiments, an effective amount of an activating agent for the thickener, such as an acid neutralizing agent, is added to the mixture of particulate admixture component, thickener and water, to adjust the pH of the mixture. The adjustment of the pH of the mixture activates the thickener and results in thickening of the liquid admixture. The combination of the particulate admixture component with a thickener and acid neutralizing agent provides a liquid admixture for cementitious compositions where the particulate component is dispersed within the admixture and is stabilized against agglomeration of particles. The thickener activating agent may be an agent that either decreases or increases the pH of the liquid admixture to activate the thickening of the organic polymer thickener. It should be noted that the activating agent may be capable of adjusting the pH from an acidic pH to an alkaline pH, or from an alkaline pH to an acidic pH. The activating agent may also be capable of adjusting the pH of the liquid admixture having an acidic pH from a more acid pH to a less acidic pH, or from a less acidic pH to a more acidic pH, while maintaining the pH of the liquid admixture within the acidic pH range. The activating agent may also be capable of adjusting the pH of the liquid admixture having an alkaline pH from a more alkaline pH to less alkaline pH, or from a less alkaline pH to a more alkaline pH, while maintaining the pH of the liquid admixture within the alkaline pH range.

According to certain illustrative embodiments, the acid neutralizing agent is an agent that is effective in increasing the pH of the mixture by neutralizing acid groups on the thickener present in the mixture to achieve a thickening effect. According to certain embodiments, and without limitation, an effective amount of an acid neutralizing agent is added to the mixture of particulate admixture component, thickener, and water to increase the pH of the mixture to activate the thickener. The increase in the pH of the mixture activates the thickener and results in thickening of the mixture. The combination of the alkali-silica reaction mitigating additive with a thickener and acid neutralizing agent provides a liquid admixture for cementitious compositions where the particulate admixture component is dispersed in the admixture and is stabilized against agglomeration.

For purposes of this Specification, the phrase "stabilized against agglomeration" means that the particles of the particulate admixture component agglomerate less in the presence of the activated thickener as compared to the absence of the thickener. For example, and without limitation, the particles stabilized against agglomeration may agglomerate at least about 5 percent less than particles that have not been stabilized against agglomeration. For example, and without limitation, the particles stabilized against agglomeration may agglomerate at least about 10 percent less than particles that have not been stabilized against agglomeration. For example, and without limitation, the particles stabilized against agglomeration may agglomerate at least about 25 percent less than particles that have not been stabilized against agglomeration. For example, and without limitation, the particles stabilized against agglomeration may agglomerate at least about 50 percent less than particles that have not been stabilized against agglomeration. For example, and without limitation, the particles stabilized against agglomeration may agglomerate at least about 75 percent less than particles that have not been stabilized against agglomeration. For example, and without limitation, the particles stabilized against agglomeration may agglomerate at least about 85 percent less than particles that have not been stabilized against agglomeration. For example, and without limitation, the particles stabilized against agglomeration may agglomerate at least about 95 percent less than particles that have not been stabilized against agglomeration.

For purposes of this Specification, the phrase "stabilized against physical separation" means that the liquid admixture containing particles of the particulate admixture component exhibit less physical separation of the particles of particulate admixture component from the liquid phase of the liquid admixture in the presence of the activated thickener as compared to the absence of the thickener. For example, and without limitation, the liquid admixture containing a plurality of particles particulate admixture component are stabilized against agglomeration exhibits at least about 95 percent less physical separation of the particles of particulate admixture component from the liquid phase of the liquid admixture in the presence of the activated thickener as compared to the absence of the thickener. For example, and without limitation, the liquid admixture containing a plurality of the particles of particulate admixture component are stabilized against agglomeration exhibits at least about 85 percent less physical separation of the particles of particulate admixture component from the liquid phase of the liquid admixture in the presence of the activated thickener as compared to the absence of the thickener. For example, and without limitation, the liquid admixture containing a plurality of the particles of particulate admixture component are stabilized against agglomeration exhibits at least about 75 percent less physical separation of the particles of particulate admixture component from the liquid phase of the liquid admixture in the presence of the activated thickener as compared to the absence of the thickener. For example, and without limitation, the liquid admixture containing a plurality of the particles of particulate admixture component are stabilized against agglomeration exhibits at least about 50 percent less physical separation of the particles of particulate admixture component from the liquid phase of the liquid admixture in the presence of the activated thickener as compared to the absence of the thickener. For example, and without limitation, the liquid admixture containing a plurality of the particles of particulate admixture component are stabilized against agglomeration exhibits at least about 25 percent less physical separation of the particles of the particles of particulate admixture component from the liquid phase of the liquid admixture in the presence of the activated thickener as compared to the absence of the thickener. For example, and without limitation, the liquid admixture containing a plurality of the particles of particulate admixture component are stabilized against agglomeration exhibits at least about 10 percent less physical separation of the particles of particulate admixture component from the liquid phase of the liquid admixture in the presence of the activated thickener as compared to the absence of the thickener. For example, and without limitation, the liquid admixture containing a plurality of the particles of particulate admixture component are stabilized against agglomeration exhibits at least about 5 percent less physical separation of the particles of particulate admixture component from the liquid phase of the liquid admixture in the presence of the activated thickener as compared to the absence of the thickener.

Without limitation, the particulate admixture component may be selected from mineral additives and microspheres. The microspheres may include inorganic microsphere such as glass microspheres. The microspheres may also include organic polymer microspheres. The microspheres may be either hollow or solid microspheres. According to certain embodiments, the microspheres may include a blend of both glass microspheres and organic polymer microspheres.

The expandable polymeric microspheres may be comprised of a polymer that is at least one of polyethylene, polypropylene, polymethyl methacrylate, poly-o-chlorostyrene, polyvinyl chloride, polyvinylidene chloride, polyacrylonitrile, polymethacrylonitrile, polystyrene, and copolymers thereof, such as copolymers of vinylidene chloride-acrylonitrile, polyacrylonitrile-copolymethacrylonitrile, polyvinylidene chloride-polyacrylonitrile, or vinyl chloride-vinylidene chloride, and the like. As the microspheres are composed of polymers, the wall may be flexible, such that it moves in response to pressure. The material from which the microspheres are to be made, therefore, may be flexible, and, in certain embodiments, resistant to the alkaline environment of cementitious compositions. Without limitation, suitable expandable polymeric microspheres are available from Eka Chemicals Inc., an Akzo Nobel company (Duluth, GA), under the trade name EXPANCEL®.

According to certain illustrative embodiments, the particulate admixture component of the liquid admixture comprises an amorphous silica fume. According to certain illustrative embodiments, the particulate admixture component of the liquid admixture comprises an alkali-silica reaction mitigating amount of amorphous zirconia silica fume. Zirconia silica fume is a fine amorphous particulate material prepared from zircon sand (zirconium silicate, chemical formula $ZrSiO_4$). Zircon sand typically comprises about 67 weight percent zirconia (zirconium dioxide, chemical formula $ZrO_2$) and about 33% silica (silicon dioxide, chemical formula $SiO_2$). The zircon sand is subjected to a fusion process in an electric arc furnace to recover zirconium oxide ($ZrO_2$). During the electric arc fusion process, the zirconia silica fume is separated from the zircon sand and collected as a particulate.

The chemical composition of the zirconia silica fume is greater than about 80 weight percent silica, greater than 0 to about 15 weight percent zirconia, and 0 to about 5 weight percent impurities. According to other illustrative embodiments, the chemical composition of the zirconia silica fume is greater than about 85 weight percent silica, greater than 0 to about 10 weight percent zirconia, and 0 to about 5 weight percent impurities. According to other illustrative embodiments, the chemical composition of the zirconia silica fume is greater than about 86 weight percent silica, greater than 0 to about 9 weight percent zirconia, and 0 to about 5 weight percent impurities. According to other illustrative embodiments, the chemical composition of the zirconia silica fume is greater than about 87 weight percent silica, greater than 0 to about 8 weight percent zirconia, and 0 to about 5 weight percent impurities. According to other illustrative embodiments, the chemical composition of the zirconia silica fume is greater than about 88 weight percent silica, greater than 0 to about 7 weight percent zirconia, and 0 to about 5 weight percent impurities. According to other illustrative embodiments, the chemical composition of the zirconia silica fume is greater than about 89 weight percent silica, greater than 0 to about 9 weight percent zirconia, and 0 to about 5 weight percent impurities. According to other illustrative embodiments, the chemical composition of the zirconia silica fume is greater than about 90 weight percent silica, greater than 0 to about 5 weight percent zirconia, and 0 to about 5 weight percent impurities. The amounts of silica, zirconia and impurities present is based on the total weight of the zirconia silica fume.

According to other illustrative embodiments, the chemical composition of the zirconia silica fume is (i) about 80 to about 90 weight percent silica, (ii) about 1 to about 10 weight percent, or about 2 to about 10 weight percent, or about 3 to about 10 weight percent, or about 4 to about 10 weight percent, or about 5 to about 10 weight percent, or about 6 to about 10 weight percent, or about 7 to about 10 weight percent, or about 8 to about 10 weight percent, or about 9 to about 10 weight percent zirconia, and (iii) 0 to about 5 weight percent impurities. The amounts of silica, zirconia and impurities present is based on the total weight of the zirconia silica fume.

According to other illustrative embodiments, the chemical composition of the zirconia silica fume is (i) about 85 weight percent or greater silica, (ii) about 1 to about 10 weight percent, or about 2 to about 10 weight percent, or about 3 to about 10 weight percent, or about 4 to about 10 weight percent, or about 5 to about 10 weight percent, or about 6 to about 10 weight percent, or about 7 to about 10 weight percent, or about 8 to about 10 weight percent, or about 9 to about 10 weight percent zirconia, and (iii) 0 to about 5 weight percent impurities. The amounts of silica, zirconia and impurities present is based on the total weight of the zirconia silica fume.

The impurities may be calcia (calcium oxide, chemical formula CaO), alumina (aluminum oxide, chemical formula $Al_2O_3$), iron oxide and mixtures of these impurities. According to other illustrative embodiments, the chemical composition of the zirconia silica fume is greater than about 85 weight percent silica, greater than 0 to about 10 weight percent zirconia, and 0 to about 5 weight percent impurities comprising calcia and alumina. According to other illustrative embodiments, the chemical composition of the zirconia silica fume is greater than about 85 weight percent silica, greater than 0 to about 10 weight percent zirconia, and 0 to about 4 weight percent calcia impurity, and greater than 0 to about 1 weight percent alumina impurity. According to other illustrative embodiments, the chemical composition of the zirconia silica fume is greater than about 88 weight percent silica, greater than 0 to about 9 weight percent zirconia, and 0 to about 2.5 weight percent calcia impurity and greater than 0 to about 0.5 weight percent alumina impurity. The amounts of silica, zirconia and impurities present is based on the total weight of the zirconia silica fume.

According to other illustrative embodiments, the chemical composition of the zirconia silica fume is (i) about 90 to about 99 weight percent silica, (ii) about 1 to about 10 weight percent zirconia, and (iii) less than about 0.25 weight percent calcia. The amounts of silica, zirconia and calcia present is based on the total weight of the zirconia silica fume.

According to other illustrative embodiments, the chemical composition of the zirconia silica fume is (i) about 80 to about 86 weight percent silica, (ii) about 1 to about 10 weight percent zirconia, and (iii) about 1 to about 5 weight percent calcia. The amounts of silica, zirconia and calcia present is based on the total weight of the zirconia silica fume.

According to other illustrative embodiments, the chemical composition of the zirconia silica fume is greater than about 90 weight percent silica, greater than 5 to about 10 weight percent zirconia and 0 to about 5 weight percent impurities wherein the impurities include less than 0.5 weight percent calcia. According to other illustrative embodiments, the chemical composition of the zirconia silica fume is greater than about 90 weight percent silica, greater than 5 to about 10 weight percent zirconia and 0 to about 5 weight percent impurities wherein the impurities include less than 0.25 weight percent calcia. According to other illustrative embodiments, the chemical composition of the zirconia silica fume is greater than about 90 weight percent silica, greater than 5 to about 10 weight percent zirconia and 0 to about 5 weight percent impurities wherein the impurities include less than 0.125 weight percent calcia. The amounts of silica, zirconia and calcia present is based on the total weight of the zirconia silica fume.

The particles of zirconia silica fume may exhibit a certain granularity, narrow particle size distribution and a large surface area. The particles of zirconia silica fume exhibit a particle size distribution (d50) of 10 μm or less. The particles of zirconia silica fume exhibit a particle size distribution (d50) of 6 μm, or 5 μm, or 4 μm, or 3 μm, or 2 μm, or 1 μm. A particle size distribution d50 of no greater than 6 μm is optimal for particle dispersion within an aqueous slurry admixture for mitigation of the alkali-silica reaction. The particles of zirconia silica fume may exhibit a BET surface area in the range of about 1 to about 30 $m^2/g$, about 10 to about 30 $m^2/g$, about 10 to about 25 $m^2/g$, about 15 to about 25 $m^2/g$, about 10 to about 15 $m^2/g$, about 1 to about 20 $m^2/g$, about 5 to about 20 $m^2/g$, about 10 to about 20 $m^2/g$, about 12 to about 20 $m^2/g$, or about 15 to about 20 $m^2/g$. Particularly useful zirconia silica fume particles have a measured BET surface area in the range of about 12 to about 20 $m^2/g$. The crystalline structure of the particles of zirconia silica fume may me monoclinic, tetragonal or cubic.

Without limitation, and only by way of illustration, suitable zirconia silica fume for use in the present admixture composition, cementitious composition and methods are commercially available from Henan Superior Abrasives Import and Export Co., Ltd. (Zhengzhou, Henan, China), Luoyang Ruowen Trading Co., Ltd. (Hongshan Township, Xigong District, Luoyang Henan, China), Saint-Gobain Research (China) Co., Ltd. (Min Hang Development Zone, Shanghai, China), TAM Ceramics, LLC (Niagara Falls, New York, USA), and Washington Mills Tonawanda, Inc. (Tonawanda, New York, USA).

The particles of the particulate admixture component are stabilized against agglomeration within the aqueous liquid slurry admixture, and the liquid admixture itself is stabilized against physical separation, through a combination of a plurality of particles of the particulate admixture component and an activated polymeric thickener. The polymeric thickener may be activated through pH adjustment with the pH adjusting agent. For example, the pH adjusting agent may comprise an acid neutralizing agent to neutralize at least a portion of the acid groups of the polymer thickener. The thickeners for the admixture comprise organic polymer thickeners. Suitable organic polymer thickeners for the admixture composition may include cross-linked acrylic polymer thickeners, alkali soluble emulsion polymer thickeners and associative polymer thickeners.

Without limitation, and only by way of illustration, suitable commercially available cross-linked acrylic polymers include CARBOPOL ETD-2691, CARBOPOL EZ-2 and CARBOPOL EZ-5 commercially available from The Lubrizol Corporation (Cleveland, Ohio, USA). These cross-linked poly(acrylic) acid polymers thicken through absorption of water following activation by pH neutralization. CARBOPOL ETD-2619, CARBOPOL EZ-2 and CARBOPOL EZ-5 are cross-linked poly(acrylic acid) polymers that are easily dispersed in aqueous systems, and provide solution thickening upon neutralization (ie, an increase in pH) and shear-thinning rheology properties to enable dispensing or pumping of finished products.

Without limitation, and only by way of illustration, suitable commercially available alkali soluble emulsion polymer thickeners include ACRYSOL ASE-60 and ACRYSOL ASE-1000 commercially available from The Dow Chemical Company (Midland, Michigan, USA). These thickeners are copolymers of an acid and an ester. According to certain embodiments, these organic thickeners are copolymers of methacrylic acid and alkyl acrylate ester. According to yet further embodiments, these organic thickeners are copolymers of methacrylic acid and ethyl acrylate ester. The copolymer may have a 50:50 ratio of methacrylic acid to ethyl acrylate ester. The methacrylic acid is soluble in water, while the ethyl acrylate ester is insoluble in water. These alkali-soluble/swellable emulsion polymers are generally insoluble at low pH and soluble at high pH. At low pH these emulsion thickeners are not soluble in water and do not impart any thickening to the admixture composition. Upon pH neutralization these alkali-soluble polymer emulsions become soluble and clear, and thickening of the admixture composition occurs. Both ACRYSOL ASE-60 and ACRYSOL ASE-1000 are supplied as a low viscosity, low pH aqueous emulsions. The thickening of the admixture composition is triggered by a change from low pH to high pH (ie, pH-triggered thickeners). The alkali-soluble emulsion polymer thickeners may be activated (ie, "triggered") at about pH 8. Both ACRYSOL ASE-60 and ACRYSOL ASE-1000 are non-cellulosic, acid-containing cross-linked acrylic emulsion polymers. Upon acid neutralization with a base, the emulsion thickeners impart thickening to the admixture composition through swelling of the emulsion particles.

Associative thickeners are polymers that are modified to contain hydrophobic groups. The associative thickeners impart thickening through both pH-activated (ie, pH-triggered) water absorption and through association of hydrophobic groups. The hydrophobic groups of the associative thickeners interact with each other and with other components in the admixture composition to create a three-dimensional polymer network within the admixture composition. The three-dimensional network restricts the motion of components within the admixture which results in thickening. Without limitation, and only by way of illustration, suitable commercially available associative polymer thickeners include CARBOPOL ETD 2623, CARBOPOL EZ-3 and CARBOPOL EZ-4 commercially available from The Lubrizol Corporation (Cleveland, Ohio, USA) and ACRYSOL TT-615 commercially available from The Dow Chemical Company (Midland, Michigan, USA).

For illustrative embodiments of the admixture that include an alkali-activated thickener, the acid neutralizing agent is added to the mixture of the particulate admixture component and the polymeric thickener to raise the pH of the admixture to a pH where the thickening action of the thickener of the liquid admixture begins, starts, or otherwise commences. The acid neutralizing agent is any alkali or base substance or combination of substances that react with an acid to neutralize it. These agent usually alkali metal oxides, alkaline earth metal oxides, alkali metal hydroxides, alkaline earth metal hydroxides, alkali metal carbonates, alkaline earth metal hydroxides, alkali metal hydrogen carbonates, alkaline earth metal hydrogen carbonates, ammonium hydroxide and amines. According to certain illustrative embodiments, the acid neutralizing agent comprises one or more alkaline earth hydroxides. According to certain illustrative embodiments, the alkaline metal hydroxide comprises calcium hydroxide or magnesium hydroxide. According to certain illustrative embodiments, the acid neutralizing agent comprises one or more alkali metal hydroxides. According to certain illustrative embodiments, the alkali metal hydroxide comprises sodium hydroxide or potassium hydroxide.

According to other illustrative embodiments, the admixture composition contains the particles of the particulate admixture component, the polymeric thickener and water, and has an initial pH which is sufficient to achieve activation of the polymer thickener and thickening of the liquid admixture without the addition of a pH adjusting agent.

According to other illustrative embodiments, the initial pH of the liquid admixture requires that the pH be adjusted to activate the thickening effect of the thickener. According to certain illustrative embodiments, the admixture composition containing may have an initial pH in the range of about 4 to about 7. According to certain illustrative embodiments, the acid neutralizing agent is added in an amount sufficient to increase the initial pH of the mixture of about 5 to about 7, to a more alkaline pH in the range of about 5 to about 13. According to certain illustrative embodiments, the acid neutralizing agent is added to the mixture in an amount sufficient to increase the initial pH of the mixture of about 5 to about 7, to a more alkaline pH in the range of about 8 to about 12. According to certain illustrative embodiments, the acid neutralizing agent is added to the mixture in an amount sufficient to increase the initial pH of the mixture of about 6 to about 7, to a more alkaline pH in the range of about 8 to about 12. According to certain illustrative embodiments, the acid neutralizing agent is added to the mixture in an amount sufficient to increase the initial pH of the mixture of about 5 to about 7, to a more alkaline pH in the range of about 8 to about 11. According to certain illustrative embodiments, the acid neutralizing agent is added to the mixture in an amount sufficient to increase the initial pH of the mixture of about 5 to about 7, to a more alkaline pH in the range of about 8 to about 10.

For embodiments where the particles of particulate admixture component comprise dense microspheres or particles of zirconia silica fume, the admixture composition of the present disclosure comprises from about 0.5 to about 80 weight percent of the particulate admixture component, from about 0.02 to about 5 weight percent of the thickener (solids basis), from about 10 to about 98 weight percent water, and from greater than 0 to about 4 weight percent (solids basis) of the acid neutralizing agent.

Disclosed is a method of making an admixture for cementitious compositions containing a stabilized particulate admixture component. The method of making the admixture comprises combining together a desired amount of particulate admixture component, a thickener for the particles of particulate admixture component, and water to form an aqueous mixture. The method may involve dispersing the particulate admixture component in a suitable amount of water to form an aqueous dispersion. The organic polymer thickener is added to the dispersion, and the pH of the mixture is adjusted by the addition of an acid neutralizing agent.

A cementitious composition comprising the disclosed admixture is further disclosed. The cementitious composition comprises a hydraulic cementitious binder, one or more mineral aggregates, the presently disclosed stabilized admixture, and a sufficient amount of water to hydrate the hydraulic binder of the cementitious composition.

As used herein, the term cement refers to any hydraulic cement. Hydraulic cements are materials that set and harden in the presence of water. Suitable non-limiting examples of hydraulic cements include Portland cement, masonry cement, alumina cement, refractory cement, magnesia cements, such as a magnesium phosphate cement, a magnesium potassium phosphate cement, calcium aluminate cement, calcium sulfoaluminate cement, calcium sulfate hemi-hydrate cement, oil well cement, ground granulated blast furnace slag, natural cement, hydraulic hydrated lime, and mixtures thereof. Portland cement, as used in the trade, means a hydraulic cement produced by pulverizing clinker, comprising of hydraulic calcium silicates, calcium aluminates, and calcium ferroaluminates, with one or more of the forms of calcium sulfate as an interground addition. Portland cements according to ASTM C150 are classified as types I, II, III, IV, or V.

The cementitious composition may also include any cement admixture or additive including set accelerators, set retarders, air entraining agents, air detraining agents, corrosion inhibitors, dispersants, pigments, plasticizers, super plasticizers, wetting agents, water repellants, fibers, damp-proofing agent, gas formers, permeability reducers, pumping aids, fungicidal admixtures, germicidal admixtures, insecticidal admixtures, bonding admixtures, strength enhancing agents, shrinkage reducing agents, aggregates, pozzolans, and mixtures thereof.

The term dispersant as used throughout this specification includes, among others, polycarboxylate dispersants. Polycarboxylate dispersants refer to dispersants having a carbon backbone with pendant side chains, wherein at least a portion of the side chains are attached to the backbone through a carboxyl group, an ether group, an amide group or an imide group. The term dispersant is also meant to include those chemicals that also function as a plasticizer, water reducers, high range water reducers, fluidizer, antiflocculating agent, or superplasticizer for cementitious compositions. Without limitation, and only by way of illustration, suitable dispersants include polycarboxylates (including polycarboxylate ethers), lignosulfonates (calcium lignosulfonates, sodium lignosulfonates and the like), salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins, polyaspartates, oligomeric dispersants and mixtures thereof.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Without limitation, and only by way of illustration, suitable air entrainers include salts of wood resin, certain synthetic detergents, salts of sulfonated lignin, salts of petroleum acids, salts of proteinaceous material, fatty and resinous acids and their salts, alkylbenzene sulfonates, salts of sulfonated hydrocarbons and mixtures thereof.

Set retarder admixtures are used to retard, delay, or slow the rate of setting of concrete. Set retarders can be added to the concrete mix upon initial batching or sometime after the hydration process has begun. Set retarders are used to offset the accelerating effect of hot weather on the setting of concrete, or delay the initial set of concrete or grout when difficult conditions of placement occur, or problems of delivery to the job site, or to allow time for special finishing processes or to aid in the reclamation of concrete left over at the end of the work day. Without limitation, and only by way of illustration, suitable set retarders include lignosulfonates, hydroxylated carboxylic acids, lignin, borax, gluconic, tartaric and other organic acids and their corresponding salts, phosphonates, certain carbohydrates and mixtures thereof may be used as a set retarder.

Air detrainers are used to decrease the air content in the mixture of concrete. Without limitation, and only by way of illustration, suitable air detrainers include tributyl phosphate, dibutyl phthalate, octyl alcohol, water-insoluble esters of carbonic and boric acid, silicones and mixtures thereof.

Bonding agents may be added to Portland cement compositions to increase the bond strength between old and new concrete. Without limitation, and only by way of illustration, suitable bonding agents include organic materials such as rubber, polyvinyl chloride, polyvinyl acetate, acrylics, styrene butadiene copolymers, other powdered polymers and mixtures thereof.

Corrosion inhibitors may be included in the cementitious compositions to protect embedded reinforcing steel from corrosion. The high alkaline nature of the concrete causes a passive and non-corroding protective oxide film to form on the steel. However, carbonation or the presence of chloride ions from deicers or seawater can destroy or penetrate the film and result in corrosion. Corrosion-inhibiting admixtures chemically mitigate this corrosion reaction. Without limitation, and only by way of illustration, suitable corrosion inhibitors include calcium nitrite, sodium nitrite, sodium benzoate, certain phosphates or fluorosilicates, fluoroaluminates, amines, fatty esters, and mixtures thereof.

Dampproofing agents may be included in the cementitious compositions reduce the permeability of concrete that have low cement contents, high water-cement ratios, or a deficiency of fines in the aggregate. The dampproofing agents retard moisture penetration into dry concrete. Without limitation, and only by way of illustrative, dampproofing agent include certain soaps, stearates, petroleum products and mixtures thereof.

Gas formers, or gas-forming agents, may be included in cementitious compositions to cause a slight expansion prior to hardening. The amount of expansion is dependent upon the amount of gas-forming material used and the temperature of the fresh cementitious mixture. Without limitation, and only by way of illustration, suitable gas-forming agent include aluminum powder, and mixtures thereof.

Reinforcing fibers may be distributed throughout an unhardened concrete mixture. Upon hardening of the mixture, this concrete is referred to as fiber-reinforced concrete. The cementitious mixture may include inorganic fibers, organic fibers, and blends of these types of fibers. Without limitation and only by way of illustration, suitable reinforcing fibers that may be included in the zirconium fibers, metal fibers, metal alloy fibers (eg, steel fibers), fiberglass, polyethylene, polypropylene, fibers nylon fibers, polyester fibers, rayon fibers, high-strength aramid fibers and mixtures thereof.

Fungicidal, germicidal, and insecticidal admixtures may be included in the cementitious compositions to control bacterial and fungal growth on or in the hardened cementitious structure.

The admixture composition of the present disclosure comprises particulate admixture component, thickener, water, and a dispersant for cementitious compositions. The dispersant for cementitious compositions may comprise a polycarboxylate dispersant. According to certain illustrative embodiments, the dispersant for cementitious compositions comprises a polycarboxylate ether dispersant.

Further disclosed is a method for making a cementitious composition. The method of making the cementitious composition comprises mixing together a hydraulic cementitious binder, one or more mineral aggregates, the presently disclosed stabilized admixture, and water in a sufficient amount to hydrate the hydraulic cementitious binder in the composition.

According to certain embodiments, the method of making the cementitious composition comprises mixing together a hydraulic cementitious binder, a fine aggregate comprising silica sand, a coarse aggregate comprising crushed stone, the presently disclosed admixture, and further water in a sufficient amount to hydrate the hydraulic cementitious binder in the composition.

According to certain illustrative embodiments, the method of making the cementitious composition comprises mixing together a hydraulic cementitious binder, one or more mineral aggregates, the presently disclosed admixture, further water in a sufficient amount to hydrate the hydraulic cementitious binder in the composition, and one or more additional admixture components.

Also disclosed is a method for making a hardened cementitious form or structure. The method comprises mixing together (i) a hydraulic cementitious binder, (ii) one or more mineral aggregates, (iii) the presently disclosed admixture, and (iv) further water to hydrate the hydraulic cementitious binder to form a cementitious mixture. The cementitious mixture is then placed at a selected location and to cure or harden to form a hardened cementitious structure.

It should be understood that when a range of values is described in the present disclosure, it is intended that any and every value within the range, including the end points, is to be considered as having been disclosed. For example, the amount of a component in "a range of from about 1 to about 100" is to be read as indicating each and every possible amount of that component between 1 and 100. It is to be understood that the inventors appreciate and understand that any and all amounts of components within the range of amounts of components are to be considered to have been specified, and that the inventors have possession of the entire range and all the values within the range.

In the present disclosure, the term "about" used in connection with a value is inclusive of the stated value and has the meaning dictated by the context. For example, the term "about" includes at least the degree of error associated with the measurement of the particular value. One of ordinary skill in the art would understand the term "about" is used herein to mean that an amount of "about" of a recited value results the desired degree of effectiveness in the compositions and/or methods of the present disclosure. One of ordinary skill in the art would further understand that the metes and bounds of the term "about" with respect to the value of a percentage, amount or quantity of any component in an embodiment can be determined by varying the value, determining the effectiveness of the compositions for each value, and determining the range of values that produce compositions with the desired degree of effectiveness in accordance with the present disclosure. The term "about" is further used to reflect the possibility that a composition may contain trace components of other materials that do not alter the effectiveness of the composition.

EXAMPLES

The following examples are set forth merely to further illustrate admixture compositions and methods of making the admixture compositions, cementitious compositions and method of the making the admixture and cementitious composition. Stabilized admixture compositions of either particulate polymeric microspheres or zirconia silica fume were prepared for illustration. The ASR-mitigating activity of the stabilized zirconia silica fume was analyzed in mortar compositions. The illustrative examples should not be construed as limiting the admixture composition, the cementitious composition incorporating the admixture composition, or the methods of making or using the admixture composition in any manner.

Mortar Bar Expansion Testing

The effect of the stabilized admixture compositions of zirconia silica fume to mitigate the alkali-silica reaction was evaluated in accordance with ASTM C1260-14 (Aug. 1, 2014 Edition), "*Standard Test Method for Potential Alkali Reactivity of Aggregates (Mortar-Bar Method)*." Mortar bars were prepared using Portland cement, borosilicate aggregate, water and the presently disclosed alkali-silica reaction mitigation admixture. The Portland cement used to prepare the mortar bars was selected to have an alkali content that has a negligible effect on expansion. Twenty-five weight percent (25 wt. %) of borosilicate aggregate was used as the pessimum amount of aggregate for the study. Samples of mortar compositions were placed into suitable molds for preparing the mortar bar specimens. The molds were maintained in a molding environment having a temperature in the range of 20° C. to about 27.5° C. and a relative humidity of not less than 50% for a period of about 24 hours. The mortar bar specimen were removed from the molds and placed in storage containers. The storage containers were immersed with tap water having a temperature of 23° C.±2° C. The storage containers were sealed and placed in an over or water bath at 80° C.±2° C. for a period of 24 hours. The samples were removed from the storage containers and dried with a towel. The zero reading of teach mortar bar specimen is measured and recorded. The mortar bar specimens are then placed into a container and immersed in 1N NaOH. The container is sealed and placed into an over or water bath at 80° C.±2° C. Subsequent readings of the mortar bar specimens are taken periodically for 14 days. The difference between the subsequent readings and the zero readings represent the expansion of the mortar bar specimens during a given time period.

Mortar Bar Mix Design

A study was carried out to design a suitable mortar bar mix for mortar bar expansion testing. The effect of the inclusion of 20-100 weight percent of coarse borosilicate aggregate, based on the total dry weight of the coarse and fine aggregate in the mix, on expansion of mortar bars resulting from alkali-silica reaction was evaluated. Potential mortar bar mixtures are set forth in Table 1 below.

TABLE 1

| Mix | Cement (g) | Sand (g) | Borosilicate Aggregate (g) | Water (g) | W/C |
|---|---|---|---|---|---|
| M1 | 587 | 1320 | 0 | 276 | 0.47 |
| M2 | 587 | 1056 | 264 | 276 | 0.47 |
| M3 | 587 | 792 | 528 | 276 | 0.47 |
| M4 | 587 | 528 | 792 | 276 | 0.47 |
| M5 | 587 | 264 | 1056 | 276 | 0.47 |
| M6 | 587 | 0 | 1320 | 276 | 0.47 |

Mortar bars were prepared and tested for expansion as a result of the alkali-silica reaction in accordance with ASTM C1260-14 for a period of 14 days. Expansion readings were taken at 0, 3, 5, 7, 10, 12 and 14 days. The results of the mortar mix design study are shown in FIG. 1. The greatest amount of expansion occurred in mortar bar test specimens prepared with mortar mix compositions including about 25 weight percent borosilicate aggregate. Therefore, 25 weight percent borosilicate coarse aggregate was selected as the pessimum amount of aggregate to produce the greatest amount of expansion in the mortar bar specimens.

A study was carried out to measure the effect of a colloidal silica sol as an alkali-silica reaction mitigation additive on the expansion of mortar bars. The colloidal silica sol used was comprised of 30 weight percent pure silica ($SiO_2$) (16 percent by volume) and 70 weight percent water (84 percent by volume). The density of the colloidal silica sol was 1.2 $g/cm_3$ and the pH was about 10. The average particle diameter size of the pure silica particles was 7 nm. The mortar bar mixtures evaluated are set forth in Table 2 below.

TABLE 2

| Mix | Cement (g) | Sand (g) | Borosilicate Aggregate (g) | Water (g) | W/C | Cement Dispersant (ml.) | Colloidal $SiO_2$ % cwt |
|---|---|---|---|---|---|---|---|
| C7 | 587 | 990 | 330 | 276 | 0.47 | 0 | 0 |
| C8 | 575 | 990 | 330 | 249 | 0.47 | 0 | 2 |
| C9 | 563 | 990 | 330 | 221 | 0.47 | 1 | 4 |
| C10 | 552 | 990 | 330 | 194 | 0.47 | 10 | 6 |
| C11 | 540 | 990 | 330 | 167 | 0.47 | 30 | 8 |
| C12 | 528 | 990 | 330 | 139 | 0.47 | 50 | 10 |

Figure 4:
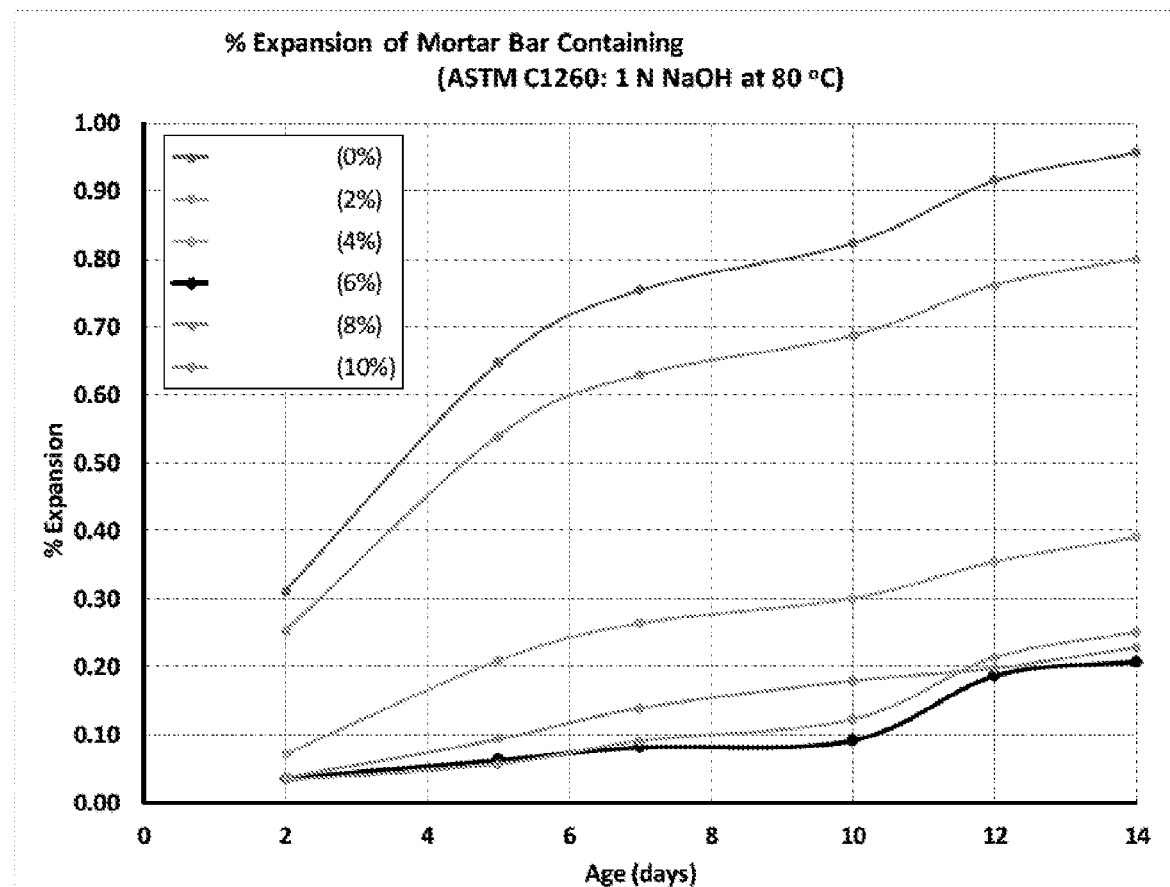
FIG. 4 is a graph showing percent expansion of mortar bar samples as a function of the amount of colloidal silica added to the mortar mix.

Mortar bars were prepared and tested for expansion as a result of the alkali-silica reaction in accordance with ASTM C1260-14 for a period of 14 days. Expansion readings were taken at 0, 3, 5, 7, 10, 12 and 14 days. The results of the mortar mix design study are shown in FIG. 4. The results indicate that the colloidal silica sol has a positive effect on the alkali-silica reaction. While there may be a benefit realized, colloidal silica sol is an expensive raw material and significantly increases the water demand for the cementitious composition. The increase in water demand will necessitate the inclusion of a dispersant or water reducer which increase the cost of the making the cementitious composition and may alter other desired performance properties.

A study was carried out to measure the effect of a densified silica fume as an alkali-silica reaction mitigation additive on the expansion of mortar bars. The mortar bar mixtures evaluated are set forth in Table 3 below.

TABLE 3

| Mix | Cement (g) | Sand (g) | Borosilicate Aggregate (g) | Water (g) | W/C | Densified Silica Fume % cwt |
|---|---|---|---|---|---|---|
| C13 | 587 | 990 | 330 | 276 | 0.47 | 0 |
| C14 | 575 | 990 | 330 | 128 | 0.47 | 2 |
| C15 | 563 | 990 | 330 | 156 | 0.47 | 4 |
| C16 | 552 | 990 | 330 | 187 | 0.47 | 6 |
| C17 | 540 | 990 | 330 | 217 | 0.47 | 8 |
| C18 | 528 | 990 | 330 | 246 | 0.47 | 10 |

Figure 2A:
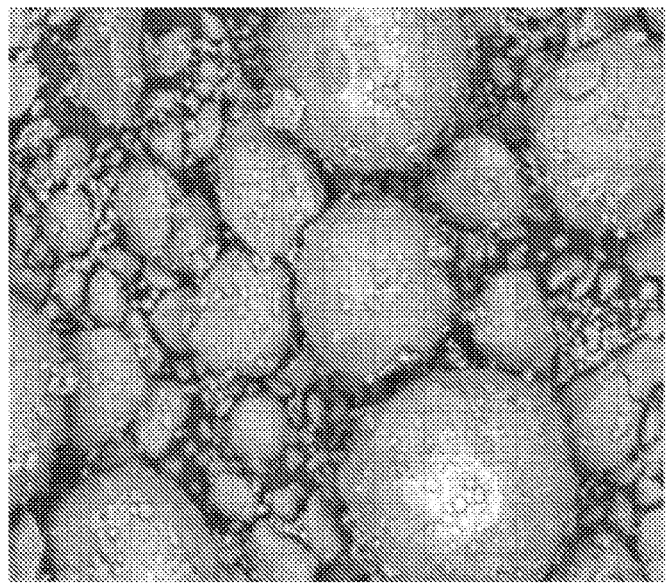
FIGS. 2A and 2B are photomicrographs showing agglomeration of densified silica fume powder.
Figure 2B:
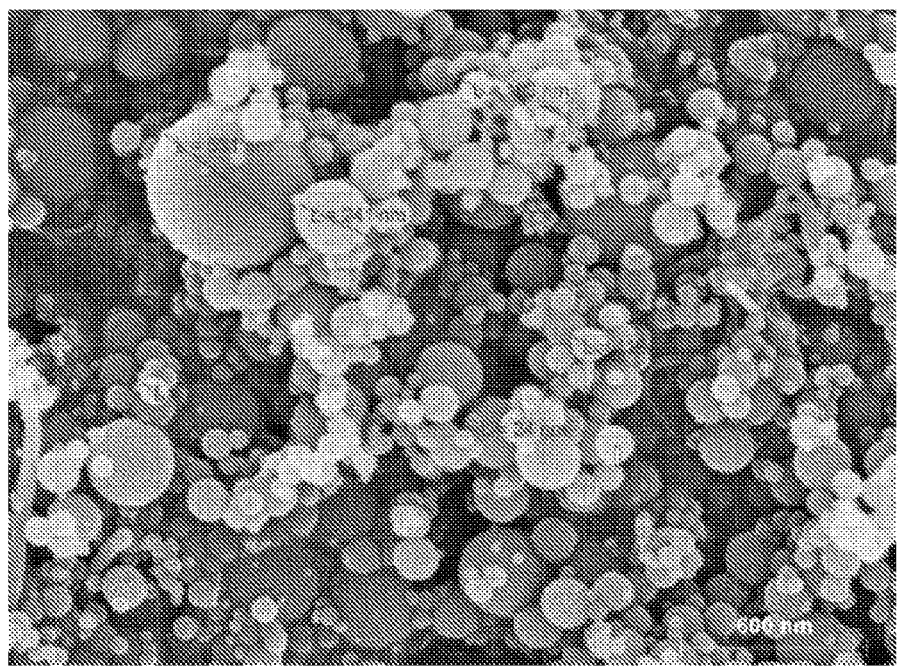
Figure 5:
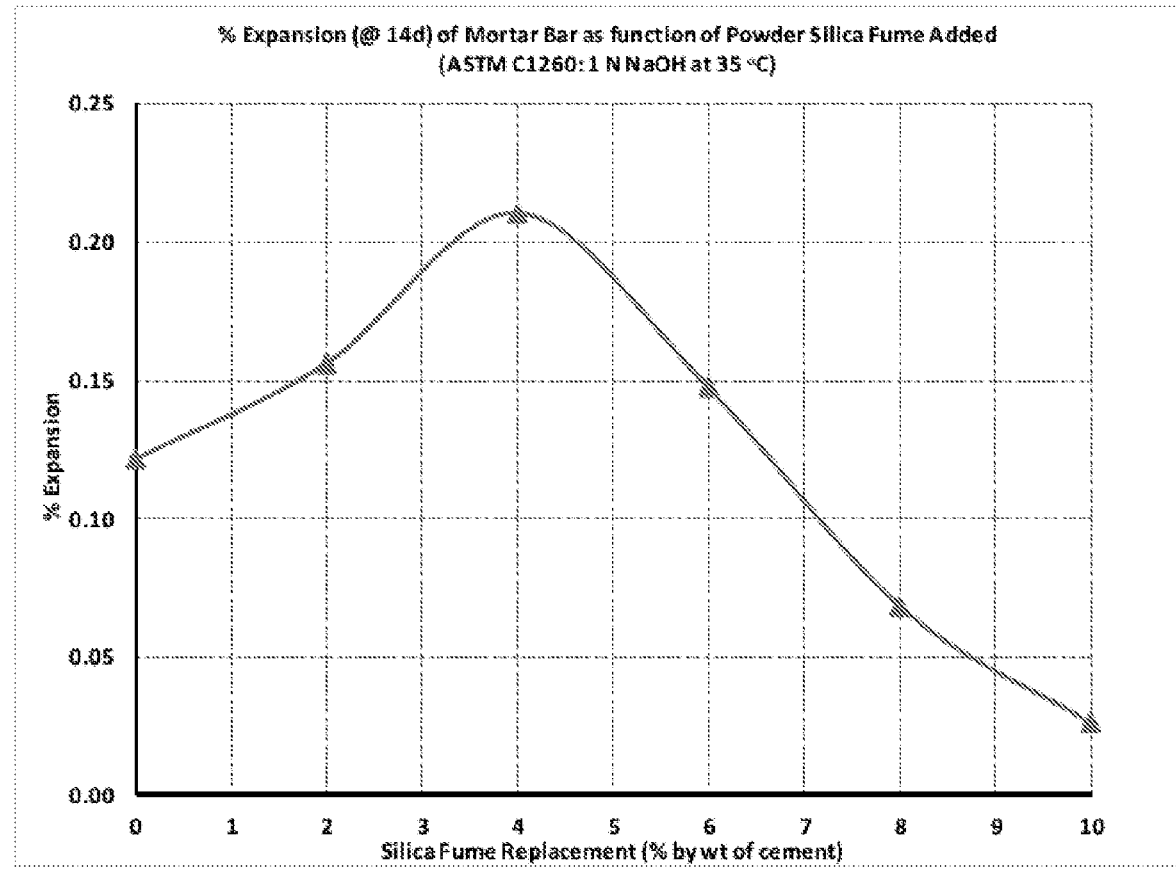
FIG. 5 is a graph showing percent expansion of mortar bar samples as a function of the amount of densified silica fume powder added to the mortar mix.

Mortar bars were prepared and tested for expansion as a result of the alkali-silica reaction in accordance with ASTM C1260-14 for a period of 14 days. Expansion readings were taken at 0, 3, 5, 7, 10, 12 and 14 days. FIGS. 2A and 2B are photomicrographs showing significant agglomeration of the densified silica fume. The results of the study are shown in FIG. 5. The inclusion of greater than 0 to about 6.5% by weight of cement (% cwt) (Examples C14-C16) of densified silica fume results in an increase in expansion of the mortar bar specimens as compared to a mortar bar specimen prepared from a mix composition without inclusion of densified silica fume (Example C13). A decrease in expansion of the mortar bars occur only with the inclusion of 8% and 10% (% cwt).

A study was carried out to measure the effect of an admixture comprising a stabilized zirconia silica fume slurry as an alkali-silica reaction mitigation admixture on the expansion of mortar bars. The admixture was thickened with an alkali-soluble polyacrylate thickener and pH adjustment with 50% NaOH. The composition of the stabilized zirconia silica fume slurry admixture is set forth in Table 4 below.

TABLE 4

| | Zirconia Silica fume | Water | Alkali-Soluble Thickener | 50% NaOH | Total |
|---|---|---|---|---|---|
| Weight (g) | 200 | 240 | 6.8 | 0.9 | 448 |
| % by weight | 44.7% | 53.6% | 1.5% | 0.2% | 100 |
| Volume (g/cm$^3$) | 80 | 240 | 6.8 | 0.9 | 328 |
| % by volume | 24.4% | 73.2% | 2.1% | 0.3% | 100 |

The mortar bar mixtures of Table 5 were prepared using the stabilized admixture of Table 4.

TABLE 5

| Mix | Cement (g) | Sand (g) | Borosilicate Aggregate (g) | Water (g) | W/C | Stabilized zirconia silica fume (g) |
|---|---|---|---|---|---|---|
| C19 | 587 | 990 | 330 | 276 | 0.47 | 0 |
| I20 | 575 | 990 | 330 | 261 | 0.47 | 26.3 |
| I21 | 563 | 990 | 330 | 247 | 0.47 | 52.5 |
| I22 | 552 | 990 | 330 | 232 | 0.47 | 78.8 |
| I23 | 540 | 990 | 330 | 218 | 0.47 | 105.1 |
| I24 | 528 | 990 | 330 | 203 | 0.47 | 131.3 |

Figure 3:
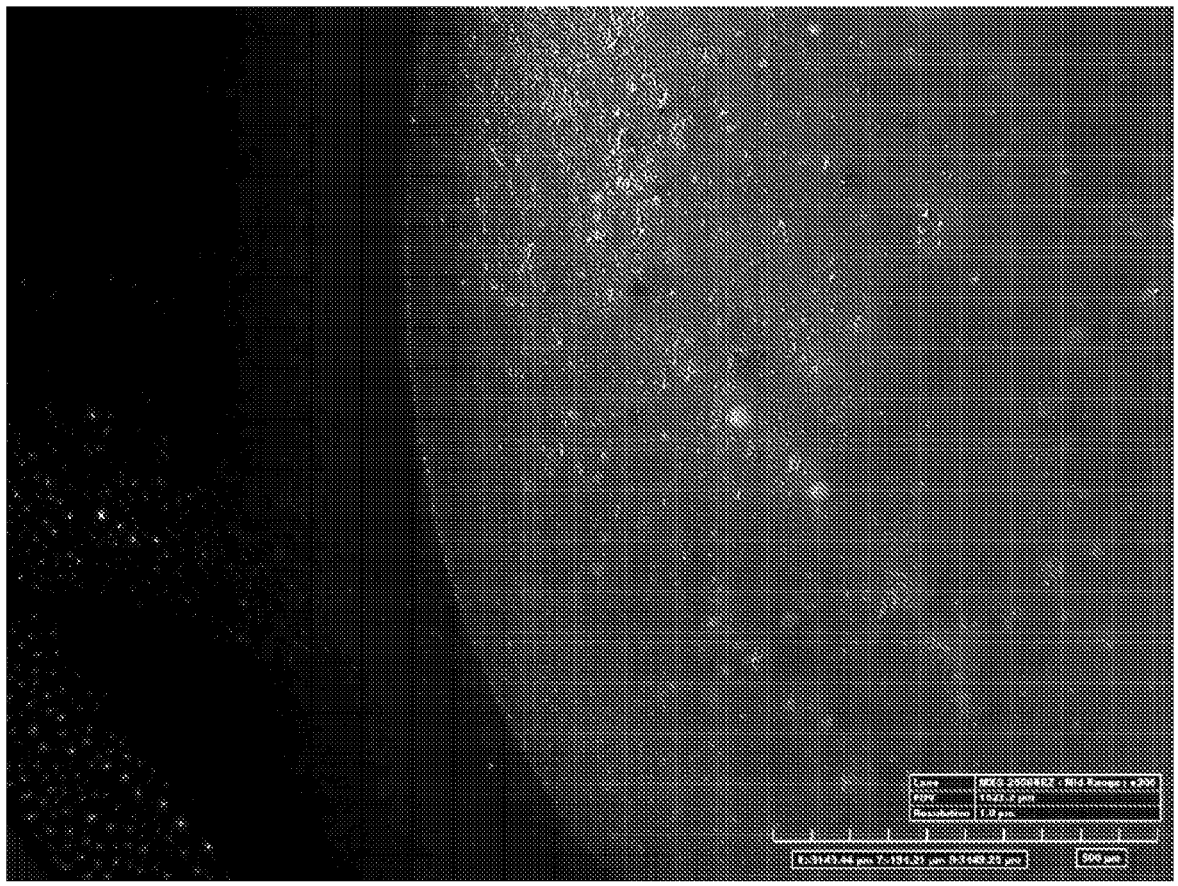
FIG. 3 is a photomicrograph of the presently disclosed aqueous admixture slurry comprising stabilized particulate additive for cementitious compositions.
Figure 6:
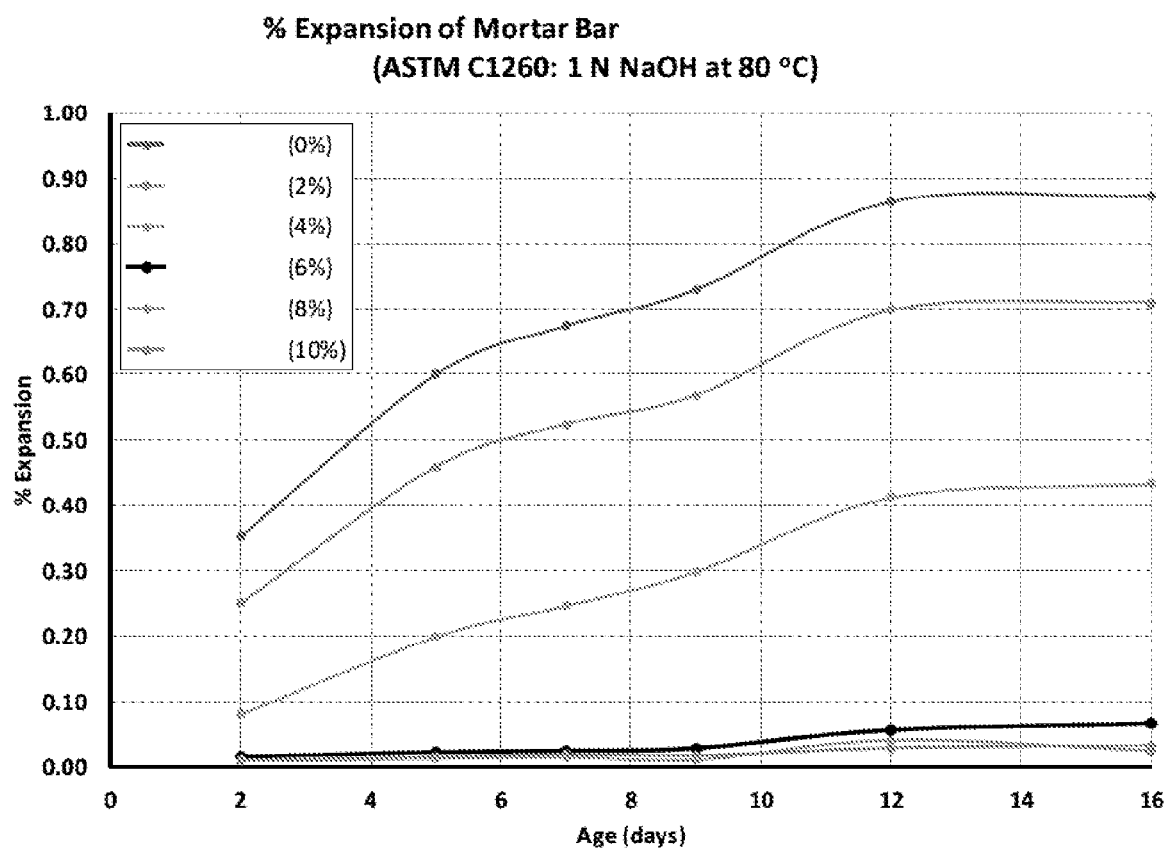
FIG. 6 is a graph showing percent expansion of mortar bar samples prepared with a mortar mix including the presently disclosed aqueous admixture slurry of stabilized zirconia silica fume.
Figure 7:
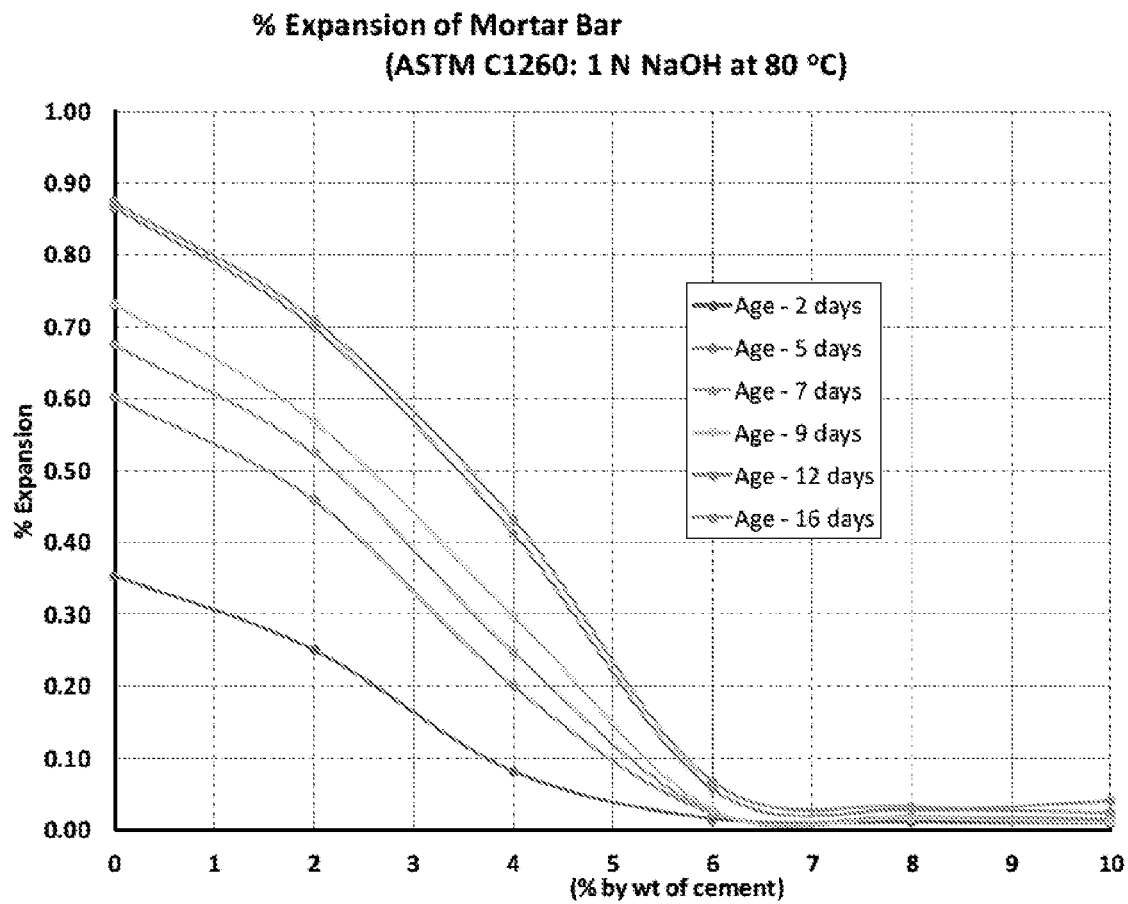
FIG. 7 is a graph showing percent expansion of mortar bar samples as a function of the amount of stabilized zirconia silica fume added to the mortar mix.

Mortar bars were prepared and tested for expansion as a result of the alkali-silica reaction in accordance with ASTM C1260-14 for a period of 14 days. Expansion readings were taken at 0, 3, 5, 7, 10, 12 and 14 days. FIG. 3 is a photomicrograph showing the thickened and stabilized zirconia silica fume slurry admixture. The results of the study are shown in FIG. 6. FIG. 7 shows the results of the study as a function of the dosage amount of the ASR mitigating admixture. The results indicate that the ASR mitigating admixture slurry of stabilized zirconia silica fume mitigates the alkali-silica reaction as evidenced by a reduction in expansion of the mortar bars as tested by ASTM C1260-14 at a dosage amount as low as 2% (% by weight of cement; % cwt.) (Example 120) as compared to the expansion of the mortar bar prepared form the control mortar mixture C19. A mortar bar prepared from the mortar mix of Example 121 containing 4% cwt. dosage of results in expansion of the mortar bar of improvement over control C19 and Example 120. Mortar bar prepared from the mortar mixtures of Examples 122-124 having dosage amounts of the ASR mitigating admixture in the range of 6% to 10% cwt. exhibit less than 10% expansion when tested in accordance with ASTM C1260-14. These results clearly show that the admixture comprised of a stabilized zirconia silica fume is highly effective at mitigating potential alkali-silica reaction between the cement pore solution and reactive aggregate containing cementitious compositions.

A study was carried out to measure the effect of the inclusion of an admixture comprising a stabilized zirconia silica fume slurry as an alkali-silica reaction mitigation admixture on the expansion of mortar bars. The admixture was thickened with an alkali-soluble polyacrylate thickener and pH adjustment with 50% NaOH. The composition of the stabilized zirconia silica fume slurry admixture is set forth in Table 6 below.

TABLE 6

| | Zirconia Silica fume | Water | Alkali-Soluble Thickener | 50% NaOH | Total |
|---|---|---|---|---|---|
| Weight (g) | 200 | 300 | 6.8 | 0.9 | 508 |
| % by weight | 39.4% | 59.1% | 1.3% | 0.2% | 100 |
| Volume (g/cm$^3$) | 40 | 300 | 6.8 | 0.9 | 388 |
| % by volume | 20.6% | 77.4% | 1.8% | 0.2% | 100 |

The mortar bar mixtures of Table 7 were prepared using the ASR mitigating admixture of Table 6.

TABLE 7

| Mix | Cement (g) | Sand (g) | Borosilicate Aggregate (g) | Water (g) | W/C | Stabilized zirconia silica fume (g) |
|---|---|---|---|---|---|---|
| C25 | 587 | 990 | 330 | 276 | 0.47 | 0 |
| I26 | 575 | 990 | 330 | 258 | 0.47 | 29.8 |
| I27 | 563 | 990 | 330 | 240 | 0.47 | 59.6 |
| I28 | 552 | 990 | 330 | 222 | 0.47 | 89.4 |
| I29 | 540 | 990 | 330 | 204 | 0.47 | 119.1 |
| I30 | 528 | 990 | 330 | 186 | 0.47 | 148.9 |

Figure 8:
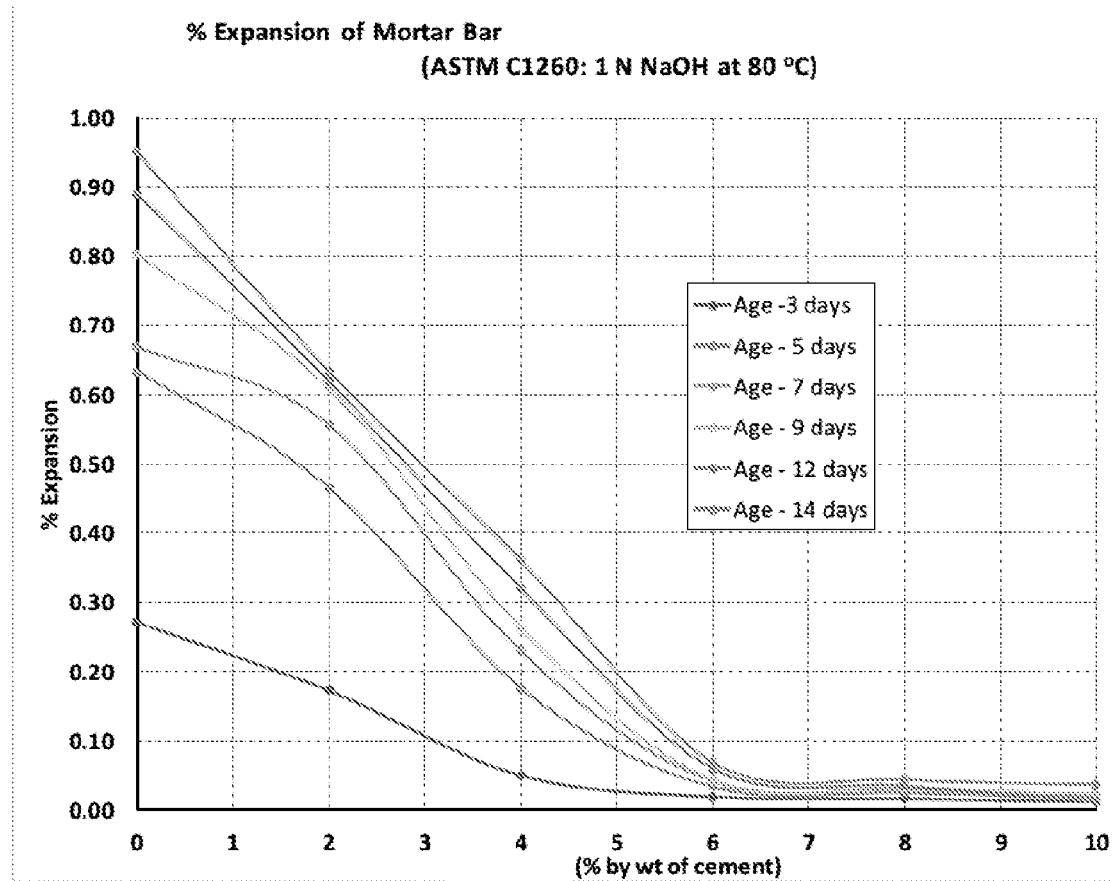
FIG. 8 is another graph showing percent expansion of mortar bar samples as a function of the amount of stabilized zirconia silica fume added to the mortar mix.

Mortar bars were prepared and tested for expansion as a result of the alkali-silica reaction in accordance with ASTM C1260-14 for a period of 14 days. Expansion readings were taken at 0, 3, 5, 7, 10, 12 and 14 days. The results of the study are shown in FIG. 8, which reports the results as a function of the dosage amount of the stabilized admixture. The results indicate that the admixture slurry of stabilized zirconia silica fume mitigates the alkali-silica reaction as evidenced by a reduction in expansion of the mortar bars as tested by ASTM C1260-14 at a dosage amount as low as 2% (% by weight of cement; % cwt.) (Example 126) as compared to the expansion of the mortar bar prepared form the control mortar mixture C25. A mortar bar prepared from the mortar mix of Example 127 containing 4% cwt. dosage of results in expansion of the mortar bar of improvement over control C25 and Example 126. Mortar bar prepared from the mortar mixtures of Examples 128-130 having dosage amounts of the admixture in the range of 6% to 10% cwt. exhibit less than 10% expansion when tested in accordance with ASTM C1260-14. These results clearly show that the admixture comprised of a stabilized zirconia silica fume is highly effective at mitigating potential alkali-silica reaction between the cement pore solution and reactive aggregate containing cementitious compositions.

Figure 9:
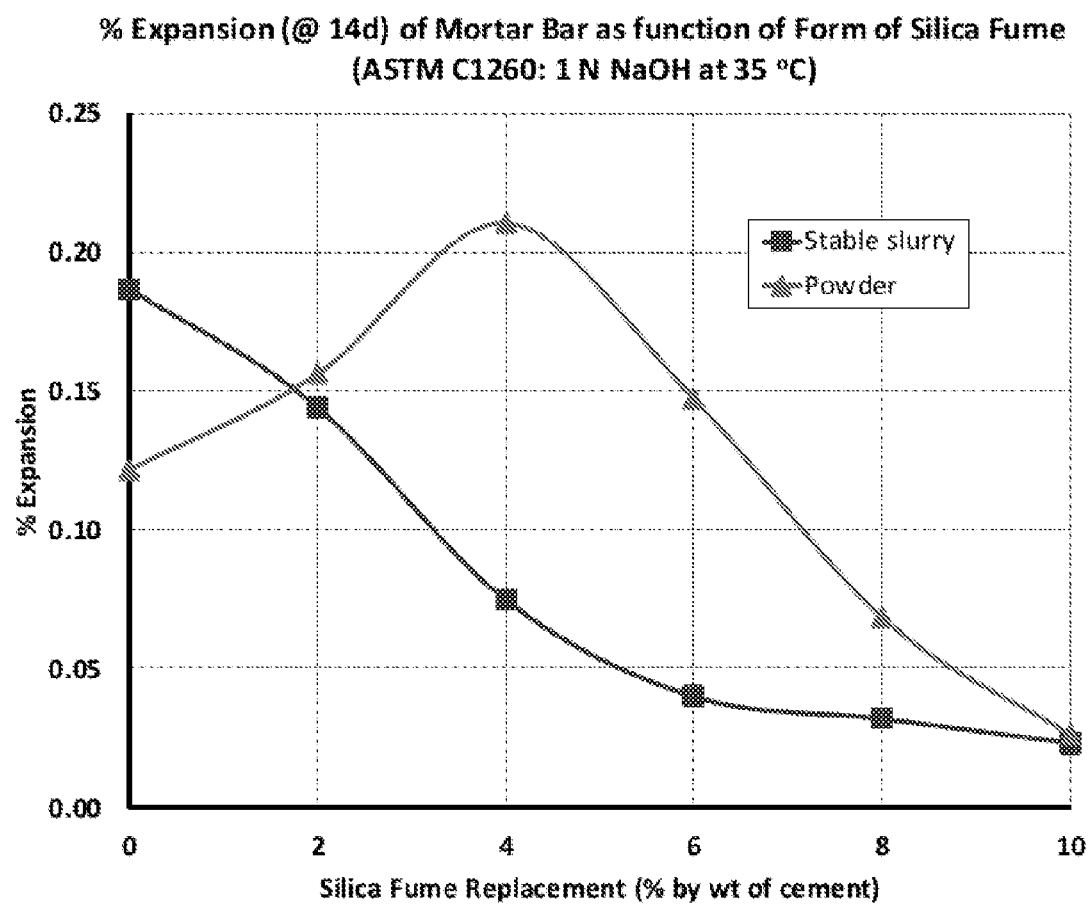
FIG. 9 is a graph depicting the comparison of the ASR-mitigating effects of stabilized zirconia silica fume and densified silica fume powder as evidenced by percent expansion of mortar bar samples.

A study was carried out to compare the effect of agglomerated densified silica fume and an aqueous admixture slurry of stabilized zirconia silica fume on expansion of mortar bars resulting from the alkali-silica reaction. FIG. 9 depicts a comparison of densified silica fume powder and a stabilized slurry admixture of zirconia silica fume on mitigation of the potential alkali-silica reaction. Mortar bars were prepared and tested in accordance with ASTM C1260-14. These results indicate that the inventive admixture comprising an aqueous slurry of stabilized zirconia silica fume mitigates the alkali-silica reaction between the cement pore solution and reactive aggregates at a dosage amount as low as 2% cwt, and the ASR-mitigating effect of the inventive admixture slurry of stabilized zirconia silica fume continues to improve at dosage amounts ranging from 2% to 10% cwt. By comparison, the use of powdered densified silica fume results in expansion of mortar bars at dosage amounts of 2% cwt. and 4% cwt. results in an increase in mortar bar expansion due to the alkali-silica reaction. The use of densified silica fume powder does not have any ASR-mitigating effect at the dosage amounts of 2% and 4% cwt. Mortar bar samples prepared with a dosage amount of 6% cwt. of the inventive admixture slurry of stabilized zirconia silica fume exhibit less than 5% expansion when tested in accordance with ASTM C1260-14, while mortar bars prepared with the amount of densified silica fume powder exhibit an expansion of 15%. Mortar bar samples prepared with a dosage amount of 8% cwt. of the inventive admixture slurry of stabilized zirconia silica fume exhibit about 3.5% expansion when tested in accordance with ASTM C1260-14, while mortar bars prepared with the amount of densified silica fume powder exhibit an expansion of 7%. Only when the dosage amounts of both the inventive admixture and the densified silica fume powder are 10% cwt. do the ASR-mitigating effects of these different materials approximate each other. These results demonstrate that much lower dosage amounts of the admixture slurry of stabilized zirconia silica fume can be used in cementitious compositions to mitigate the alkali-silica reaction, and that the mitigating effects of the admixture slurry of stabilized zirconia silica fume is much greater in the range of 2%-10% cwt., as compared to densified silica fume powder. The results further show that dosages amounts of 2% to 6% cwt. of densified silica fume powder actually have a negative effect on expansion and ASR mitigation.

A stabilized zirconia silica fume slurry admixture was prepared in accordance with the composition of Table 8 below. The zirconia silica fume used in the admixture composition was obtained from Washington Mills. The admixture was thickened with an alkali-soluble polyacrylate thickener and pH adjustment with 50% NaOH.

TABLE 8

|  | Zirconia Silica fume | Water | Alkali-Soluble Thickener | 50% NaOH | Total |
|---|---|---|---|---|---|
| Weight (g) | 200 | 270 | 6.8 | 0.9 | 478 |
| % by weight | 41.8% | 56.5% | 1.4% | 0.3% | 100 |
| Volume (g/cm$^3$) | 80 | 270 | 6.8 | 0.9 | 358 |
| % by volume | 22.4% | 75.4% | 1.9% | 0.3% | 100 |

The mortar bar mixtures of Table 8 were prepared using the stabilized admixture of Table 9.

TABLE 9

| Mix | Cement (g) | Sand (g) | Borosilicate Aggregate (g) | Water (g) | W/C | Stabilized zirconia silica fume (g) |
|---|---|---|---|---|---|---|
| I31 | 575 | 990 | 330 | 260 | 0.47 | 28 |
| I32 | 563 | 990 | 330 | 243 | 0.47 | 56 |
| I33 | 552 | 990 | 330 | 227 | 0.47 | 84 |
| I34 | 540 | 990 | 330 | 211 | 0.47 | 112 |
| I35 | 528 | 990 | 330 | 195 | 0.47 | 140 |

A stabilized zirconia silica fume slurry admixture was prepared in accordance with the composition of Table 10 below. The zirconia silica fume used in the admixture composition was obtained from Washington Mills. The admixture was thickened with an alkali-soluble polyacrylate thickener and pH adjustment with 50% NaOH.

TABLE 10

|  | Zirconia Silica fume | Water | Alkali-Soluble Thickener | 50% NaOH | Total |
|---|---|---|---|---|---|
| Weight (g) | 200 | 300 | 6.8 | 0.9 | 508 |
| % by weight | 39.4% | 59.1% | 1.3% | 0.2% | 100 |
| Volume (g/cm$^3$) | 80 | 300 | 6.8 | 0.9 | 388 |
| % by volume | 20.6% | 77.4% | 1.8% | 0.2% | 100 |

The mortar bar mixtures of Table 11 were prepared using the ASR mitigating admixture of Table 10.

TABLE 11

| Mix | Cement (g) | Sand (g) | Borosilicate Aggregate (g) | Water (g) | W/C | Stabilized zirconia silica fume (g) | 1481 (ml) |
|---|---|---|---|---|---|---|---|
| I36 | 575 | 990 | 330 | 258 | 0.47 | 28.9 | 0 |
| I37 | 563 | 990 | 330 | 240 | 0.47 | 59.6 | 0 |
| I38 | 552 | 990 | 330 | 222 | 0.47 | 89.4 | 0 |
| I39 | 540 | 990 | 330 | 204 | 0.47 | 119.1 | 1 |
| I40 | 528 | 990 | 330 | 186 | 0.47 | 148.9 | 2 |

A stabilized zirconia silica fume slurry admixture was prepared in accordance with the composition of Table 12 below. The zirconia silica fume used in the admixture composition was obtained from TAM Ceramics LLC. The admixture was thickened with an alkali-soluble polyacrylate thickener and pH adjustment with 50% NaOH.

TABLE 12

| | Zirconia Silica fume | Water | Alkali-Soluble Thickener | 50% NaOH | Total |
|---|---|---|---|---|---|
| Weight (g) | 200 | 300 | 3.1 | 0.9 | 504 |
| % by weight | 39.7% | 59.5% | 0.6% | 0.2% | 100 |
| Volume (g/cm$^3$) | 80 | 300 | 3.1 | 0.9 | 384 |
| % by volume | 20.8% | 78.1% | 0.8% | 0.2% | 100 |

The mortar bar mixtures of Table 13 were prepared using the ASR mitigating admixture of Table 12.

TABLE 13

| Mix | Cement (g) | Sand (g) | Borosilicate Aggregate (g) | Water (g) | W/C | Stabilized zirconia silica fume (g) | 1481 (ml) |
|---|---|---|---|---|---|---|---|
| I41 | 575 | 990 | 330 | 258 | 0.47 | 28.9 | 0 |
| I42 | 563 | 990 | 330 | 240 | 0.47 | 59.6 | 0 |
| I43 | 552 | 990 | 330 | 222 | 0.47 | 89.4 | 0 |
| I44 | 540 | 990 | 330 | 204 | 0.47 | 119.1 | 1 |
| I45 | 528 | 990 | 330 | 186 | 0.47 | 148.9 | 2 |

A stabilized zirconia silica fume slurry as an alkali-silica reaction mitigation admixture was prepared in accordance with the composition of Table 14 below. The zirconia silica fume used in the admixture composition was obtained from TAM Ceramics LLC. The admixture was thickened with an alkali-soluble polyacrylate thickener and pH adjustment with 50% NaOH.

TABLE 14

| | Zirconia Silica fume | Water | Alkali-Soluble Thickener | Water Reducer | 10% NaOH | Total |
|---|---|---|---|---|---|---|
| Weight (g) | 300 | 160 | 1.7 | 5.36 | 2.56 | 470 |
| % by weight | 63.9% | 34.1% | 0.35% | 1.14% | 0.55% | 100 |
| Volume (g/cm$^3$) | 120 | 160 | 1.7 | 2.56 | 2.56 | 290 |
| % by volume | 41.4% | 55.3% | 0.57% | 1.85% | 0.88% | 100 |

The mortar bar mixtures of Table 15 were prepared using the stabilized admixture of Table 14.

TABLE 15

| Mix | Cement (g) | Sand (g) | Borosilicate Aggregate (g) | Water (g) | W/C | Stabilized zirconia silica fume (g) |
|---|---|---|---|---|---|---|
| I46 | 575 | 990 | 330 | 270 | 0.47 | 19.4 |
| I47 | 563 | 990 | 330 | 262 | 0.47 | 36.7 |
| I48 | 552 | 990 | 330 | 256 | 0.47 | 55.1 |
| I49 | 540 | 990 | 330 | 249 | 0.47 | 73.5 |
| I50 | 528 | 990 | 330 | 243 | 0.47 | 91.8 |

A stabilized zirconia silica fume slurry admixture was prepared in accordance with the composition of Table 16 below. The zirconia silica fume used in the admixture composition was obtained from TAM Ceramics LLC. The admixture was thickened with an alkali-soluble polyacrylate thickener and pH adjustment with 50% NaOH.

TABLE 16

| | Zirconia Silica fume | Water | Alkali-Soluble Thickener | 50% NaOH | Total |
|---|---|---|---|---|---|
| Weight (g) | 200 | 300 | 6.8 | 0.9 | 508 |
| % by weight | 39.4% | 59.1% | 1.3% | 0.2% | 100 |
| Volume (g/cm$^3$) | 80 | 300 | 6.8 | 0.9 | 388 |
| % by volume | 20.6% | 77.4% | 1.8% | 0.2% | 100 |

The mortar bar mixtures of Table 17 were prepared using the stabilized admixture of Table 16.

TABLE 17

| Mix | Cement (g) | Sand (g) | Borosilicate Aggregate (g) | Water (g) | W/C | Stabilized zirconia silica fume (g) |
|---|---|---|---|---|---|---|
| I51 | 575 | 990 | 330 | 258 | 0.47 | 29.8 |
| I52 | 563 | 990 | 330 | 240 | 0.47 | 59.6 |
| I53 | 552 | 990 | 330 | 222 | 0.47 | 89.4 |
| I54 | 540 | 990 | 330 | 204 | 0.47 | 119.1 |
| I55 | 528 | 990 | 330 | 186 | 0.47 | 148.9 |

A stabilized zirconia silica fume slurry admixture was prepared in accordance with the composition of Table 18 below. The zirconia silica fume used in the admixture composition was obtained from Saint-Gobain. The admixture was thickened with an alkali-soluble polyacrylate thickener and pH adjustment with 50% NaOH.

TABLE 18

| | Zirconia Silica fume | Water | Alkali-Soluble Thickener | 50% NaOH | Total |
|---|---|---|---|---|---|
| Weight (g) | 200 | 155 | 3.5 | 1.5 | 360 |
| % by weight | 55.6% | 43.1% | 1% | 0.4% | 100 |
| Volume (g/cm$^3$) | 80 | 155 | 3.5 | 1.5 | 240 |
| % by volume | 33.3% | 64.6% | 1.5% | 0.6% | 100 |

The mortar bar mixtures of Table 19 were prepared using the stabilized admixture of Table 18.

TABLE 19

| Mix | Cement (g) | Sand (g) | Borosilicate Aggregate (g) | Water (g) | W/C | Stabilized zirconia silica fume (g) |
|---|---|---|---|---|---|---|
| I56 | 575 | 990 | 330 | 267 | 0.47 | 21.2 |
| I57 | 563 | 990 | 330 | 257 | 0.47 | 42.2 |
| I58 | 552 | 990 | 330 | 248 | 0.47 | 63.4 |
| I59 | 540 | 990 | 330 | 238 | 0.47 | 84.5 |
| I60 | 528 | 990 | 330 | 229 | 0.47 | 105.6 |

A stabilized zirconia silica fume slurry admixture was prepared in accordance with the composition of Table 20 below. The zirconia silica fume used in the admixture composition was obtained from Ruowen. The admixture was thickened with an alkali-soluble polyacrylate thickener and pH adjustment with 50% NaOH.

TABLE 20

| | Zirconia Silica fume | Water | Alkali-Soluble Thickener | 50% NaOH | Total |
|---|---|---|---|---|---|
| Weight (g) | 200 | 155 | 3.5 | 1.5 | 360 |
| % by weight | 55.6% | 43.1% | 1% | 0.4% | 100 |
| Volume (g/cm³) | 80 | 155 | 3.5 | 1.5 | 240 |
| % by volume | 33.3% | 64.6% | 1.5% | 0.6% | 100 |

The mortar bar mixtures of Table 21 were prepared using the stabilized admixture of Table 20.

TABLE 21

| Mix | Cement (g) | Sand (g) | Borosilicate Aggregate (g) | Water (g) | W/C | Stabilized zirconia silica fume (g) |
|---|---|---|---|---|---|---|
| I61 | 575 | 990 | 330 | 267 | 0.47 | 21.2 |
| I62 | 563 | 990 | 330 | 257 | 0.47 | 42.2 |
| I63 | 552 | 990 | 330 | 248 | 0.47 | 63.4 |
| I64 | 540 | 990 | 330 | 238 | 0.47 | 84.5 |
| I65 | 528 | 990 | 330 | 229 | 0.47 | 105.6 |

A study was carried out to investigate the effect of the inclusion of a polycarboxylate ether dispersant within an alkaline admixture comprising a stabilized zirconia silica fume particles. The admixture was thickened with an alkali-soluble polyacrylate thickener and pH adjustment with 10% NaOH. The compositions of the stabilized zirconia silica fume slurry admixture with and without a polycarboxylate ether dispersant are set forth in Tables 22A and 22B below.

TABLE 22A

| | Zirconia Silica fume | Water | Alkali-Soluble Thickener | 50% NaOH | Total |
|---|---|---|---|---|---|
| Weight (g) | 200 | 300 | 6.8 | 0.9 | 508 |
| % by weight | 39.4% | 59.1% | 1.3% | 0.2% | 100 |
| Volume (g/cm³) | 80 | 300 | 6.8 | 0.9 | 388 |
| % by volume | 20.6% | 77.4% | 1.8% | 0.2% | 100 |

TABLE 22B

| | Zirconia Silica fume | Water | Alkali-Soluble Thickener | Polycarboxylate Ether Dispersant | 10% NaOH | Total |
|---|---|---|---|---|---|---|
| Weight (g) | 300 | 113 | 0.8 | 5.4 | 4.5 | 423 |
| % by weight | 72% | 27% | 0.2% | 1.3% | 1.1% | 100 |
| Volume (g/cm³) | 120 | 113 | 0.8 | 4.7 | 4.5 | 243 |
| % by volume | 49% | 46% | 0.3% | 1.9% | 1.9% | 100 |

The viscosities of the liquid admixtures of Tables 22A and 22B were measured using a Brookfield Viscometer with a rotating #64 spindle. The results of the viscosity measurements are set forth in Table 23 below:

TABLE 23

| | 100 RPM | 50 RPM | 20 RPM |
|---|---|---|---|
| Table 22A Admixture | 2400 | 3800 | 7300 |
| Table 22B Admixture | 5000 | 8000 | 14000 |

The admixture of Table 22A includes 20.6% by volume of the zirconia silica fume and 77.4% by volume of water. The admixture of Table 22B includes 49.6% by volume zirconia silica fume and 46% by volume water. The results shown in Table 23 indicate that the inclusion of 1.9% by volume of a polycarboxylate ether dispersant solution in the admixture of Table 22B allows inclusion of over two times the amount of zirconia silica fume in the same volume while still maintaining a flowable and workable admixture that can be easily dispensed into a cementitious composition.

A further study was carried out to investigate the effect of different species of zirconia silica fume particles on the viscosity of the stabilized admixture. The admixture was thickened with an alkali-soluble polyacrylate thickener and pH adjustment with 50% NaOH. The compositions of the stabilized zirconia silica fume slurry admixtures are set forth in Tables 24A and 24B below. The zirconia silica fume of the admixture of Table 24A was obtained from TAM Ceramics, LLC. The zirconia silica fume of the admixture of Table 24B was obtained from Saint-Gobain Research (China) Co., Ltd.

TABLE 24A

| | Zirconia Silica fume | Water | Alkali-Soluble Thickener | 50% NaOH | Total |
|---|---|---|---|---|---|
| Weight (g) | 200 | 300 | 6.8 | 0.9 | 508 |
| % by weight | 39.4% | 59.1% | 1.3% | 0.2% | 100 |
| Volume (g/cm³) | 80 | 300 | 6.8 | 0.9 | 388 |
| % by volume | 20.6% | 77.4% | 1.8% | 0.2% | 100 |

TABLE 24B

| | Zirconia Silica fume | Water | Alkali-Soluble Thickener | 50% NaOH | Total |
|---|---|---|---|---|---|
| Weight (g) | 200 | 155 | 3.5 | 1.5 | 360 |
| % by weight | 56% | 43% | 1% | 0.4% | 100 |
| Volume (g/cm³) | 80 | 155 | 3.5 | 1.5 | 249 |
| % by volume | 33% | 65% | 1.5% | 0.6% | 100 |

The viscosities of the liquid admixtures of Tables 24A and 24B were measured using a Brookfield Viscometer with a rotating #64 spindle. The results of the viscosity measurements are set forth in Table 25 below:

TABLE 25

|  | 100 RPM | 50 RPM | 20 RPM |
|---|---|---|---|
| Table 24A Admixture | 2600 | 4000 | 7300 |
| Table 24B Admixture | 1000 | 1500 | 3000 |

The admixture of Table 24A includes 20.6% by volume of the zirconia silica fume from TAM Ceramics and 77.4% by volume of water. The admixture of Table 24B includes 33.3% by volume zirconia silica fume from Saint-Gobain and 65% by volume water. The results shown in Table 25 indicate that the use of zirconia silica fume obtained from Saint-Gobain results in an admixture viscosity that is more than 50% less at 100, 50 and 20 RPM the admixture prepared with zirconia silica fume obtained from TAM Ceramics, LLC.

Dispersions of polymeric microspheres were prepared in accordance with Table 26 below:

TABLE 26

|  | Expancel microspheres | Dispersant | Thickener | Water | Total |
|---|---|---|---|---|---|
| Weight (g) | 0.53 | 0.04 | 0.005 | 49.44 | 50 |
| % by weight | 1.06% | 0.09% | 0.01% | 98.84% | 100% |
| Volume (g/cm³) | 21.22 | 0.04 | 0.004 | 49.45 | 70.71 |
| % by volume | 30.02% | 0.05% | 0.01% | 69.93% | 100% |

Expancel = 042 WE 40 d25 type.
Dispersant = polycarboxylate ether type dispersant.
Thickener = substituted alkyl cellulose type polymer.

Thickened and stabilized admixture compositions were prepared microsphere dispersions of Table 26. The desired type and amount of thickener was added to the microsphere dispersion with continuous mechanical stirring at a rate of about 450 RPM. The desired amount of the 50% solution of NaOH was slowly added with increasing mixing speed to 700 RPM to neutralize acid functionality of the thickener and to bring the pH of the mixture to above pH 8.

TABLE 27

|  | C66 | I67 | I68 | I69 | I70 | I71 | C72 | C73 |
|---|---|---|---|---|---|---|---|---|
| Microsphere Solution (g) | 100 | 100 | 100 | 100 | 100 | 100 | 100 | 100 |
| Thickener 1 (g) | — | 3.57 | 7.14 | — | — | — | — | — |
| Thickener 2 (g) | — | — | — | 3.45 | 6.9 | — | — | — |
| Thickener 3 (g) | — | — | — | — | — | 3.33 | 1.66 | — |
| Thickener 4 (g) | — | — | — | — | — | — | — | 5.00 |
| 50% NaOH (g) | — | 0.30 | 0.61 | 0.36 | 0.6 | 0.28 | 0.24 | 0.28 |

Thickener 1 = ACRYLSOL ASE 60 (28% solution) (g)
Thickener 2 = ACRYLSOL ASE 1000 (29% solution) (g)
Thickener 3 = ACRYSOL TT-615 (30% solution) (g)
Thickener 4 = ACRYSOL RM2020 (20% solution) (g)

The admixture compositions were visually analyzed for stability over time. The results are reported in Table 28 below.

TABLE 28

|  | C66 | I67 | I68 | I69 | I70 | I71 | C72 | C73 |
|---|---|---|---|---|---|---|---|---|
| Initial Consistency Appearance | Pourable Immediate Separation | Pourable | Foam | Pourable | Foam | Foam | Unstable Immediate separation | Unstable Immediate separation |
| 6 Days | Separated | Stable | Stable | Stable | Stable | Stable | Separated | Separated |
| 42 Days | — | Stable | Stable | Stable | Stable | Stable | — | — |
| 50 Days | — | Slight Separation | Stable | Slight Separation | Stable | Stable | — | — |
| 120 Days | — | 5 ml liquid on bottom | Stable | 10 ml liquid on bottom | Stable | Stable | — | — |
| 232 Days | — | 10 ml liquid on bottom | Stable | 20 ml liquid on bottom | Stable | Stable | — | — |
| 358 Days | — | 10 ml liquid on bottom | Stable | 30 ml liquid on bottom | Stable | Stable | — | — |

While the admixture composition, cementitious composition including the admixture composition, and methods of making the admixture and cementitious compositions have been described in connection with various illustrative embodiments, it is to be understood that other similar embodiments may be used or modifications and additions may be made to the described embodiments for performing the same function disclosed herein without deviating therefrom. The illustrative embodiments described above are not necessarily in the alternative, as various embodiments may be combined to provide the desired characteristics. Therefore, the disclosure should not be limited to any single embodiment, but rather construed in breadth and scope in accordance with the recitation of the appended claims.

The invention claimed is:

1. A method for making an aqueous admixture composition for cementitious compositions comprising:
   combining together particles of an additive selected from polymeric microspheres and zirconia silica fume, a polymer thickener, and water to form a mixture, wherein the polymer thickener comprises a non-cellulosic, acid group-containing, cross-linked emulsion copolymer of an acid and an ester; and
   neutralizing at a least a portion of the acid groups of the polymer thickener to activate the thickening of the thickener,
   wherein said particles of said additive are stabilized against agglomeration by said activated thickener.

2. The method of claim 1, wherein particles of said additive comprise particles of polymeric microspheres having a particle size of about 10 µm to about 100 µm.

3. The method of claim 1, wherein particles of said additive comprise particles of zirconia silica fume having a particle size of about 10 nm to about 10 µm.

4. The method of claim 1, wherein said thickener is selected from the group consisting of cross-linked acrylic polymer thickeners, alkali soluble emulsion polymer thickeners and associative polymer thickeners.

5. The method of claim 4, wherein said thickener comprises a cross-linked acrylic polymer thickener.

6. The method of claim 4, wherein said thickener comprises an alkali-soluble polymer emulsion thickener.

7. The method of claim 4, wherein said thickener comprises an associative polymer thickener.

8. The method of claim 1, wherein the step of neutralizing at a least a portion of the acid groups of the polymer thickener to activate the thickening of the thickener is carried out by an acid neutralizing agent selected from the group consisting of alkali metal oxides, alkaline earth metal oxides, alkali metal hydroxides, alkaline earth metal hydroxides, alkali metal carbonates, alkaline earth metal hydroxides, alkali metal hydrogen carbonates, alkaline earth metal hydrogen carbonates, ammonium hydroxide, amines, and combinations thereof.

9. The method of claim 8, wherein said acid neutralizing agent comprises an alkali metal hydroxide.

10. The method of claim 9, wherein said alkali metal hydroxide comprises sodium hydroxide.

11. The method of claim 10, wherein the pH of said admixture is alkaline.

12. The method of claim 11, wherein the pH of said admixture composition is in the range of 8-13.

13. The method of claim 12, wherein the pH of said admixture composition is in the range of 9-12.

14. The method of claim 13, wherein the pH of said admixture composition is in the range of 9-10.

15. The method of claim 1, wherein the step of neutralizing at a least a portion of the acid groups of the polymer thickener to activate the thickening of the thickener results in a change in the pH of the admixture from an acidic pH to a less acidic pH.

16. The method of claim 1, wherein the step of neutralizing at a least a portion of the acid groups of the polymer thickener to activate the thickening of the thickener results in a change in the pH of the admixture from an acidic pH to an alkaline pH.

17. The method of claim 1, wherein the step of neutralizing at a least a portion of the acid groups of the polymer thickener to activate the thickening of the thickener results in a change in the pH of the admixture from an alkaline pH to a more alkaline pH.

18. The method of claim 1, further combining an additional admixture agent selected from the group consisting of set accelerators, set retarders, air entraining agents, air detraining agents, corrosion inhibitors, dispersants, coloring agents, pigments, plasticizers, super plasticizers, wetting agents, water repellants, fibers, dampproofing agents, gas forming agents, permeability reducing agents, pumping aids, fungicidal agents, germicidal agents, insecticidal agents, bonding agents, strength enhancing agents, shrinkage reducing agents, and mixtures thereof.

19. The method of claim 18, wherein said additional admixture agent comprises said dispersant.

20. The method of claim 19, wherein said dispersant comprises a polycarboxylate dispersant having polyether side chains.

* * * * *